(12) United States Patent
Ichikawa et al.

(10) Patent No.: US 9,981,658 B2
(45) Date of Patent: May 29, 2018

(54) AUTONOMOUS DRIVING VEHICLE SYSTEM

(71) Applicant: TOYOTA JIDOSHA KABUSHIKI KAISHA, Toyota-shi, Aichi-ken (JP)

(72) Inventors: Kentaro Ichikawa, Shizuoka-ken (JP); Toshiki Kindo, Yokohama (JP); Katsuhiro Sakai, Ann Arbor, MI (US); Masahiro Harada, Novi, MI (US); Hiromitsu Urano, Numadu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 36 days.

(21) Appl. No.: 14/943,377

(22) Filed: Nov. 17, 2015

(65) Prior Publication Data
US 2016/0139598 A1 May 19, 2016

(30) Foreign Application Priority Data

Nov. 19, 2014 (JP) ................................. 2014-234582

(51) Int. Cl.
*G05D 1/00* (2006.01)
*B60Q 1/44* (2006.01)
*G01C 21/34* (2006.01)
*B60W 30/09* (2012.01)

(52) U.S. Cl.
CPC ............... *B60W 30/09* (2013.01); *B60Q 1/44* (2013.01)

(58) Field of Classification Search
CPC .......... G05D 1/0088; B60Q 1/44; G01C 21/34
See application file for complete search history.

(56) References Cited

U.S. PATENT DOCUMENTS

| 2009/0091440 | A1* | 4/2009 | Roman ................... B60Q 1/44 340/479 |
| 2013/0110343 | A1 | 5/2013 | Ichikawa et al. |
| 2014/0336892 | A1* | 11/2014 | Braunberger ............ B60T 8/32 701/70 |

FOREIGN PATENT DOCUMENTS

| JP | 2007210595 A | 8/2007 |
| JP | 2010009607 A | 1/2010 |
| JP | 2011-162132 A | 8/2011 |
| JP | 5382218 B2 | 10/2013 |
| JP | 2014-085711 A | 5/2014 |
| WO | 2011/158347 A1 | 12/2011 |

* cited by examiner

Primary Examiner — Anne M Antonucci
(74) Attorney, Agent, or Firm — Sughrue Mion, PLLC

(57) ABSTRACT

An autonomous driving vehicle system includes: a surrounding information detection unit that is configured to detect surrounding information on a vehicle; and at least one electronic control unit including: a travel plan generation unit configured to generate a travel plan along a pre-set target route based on the surrounding information and map information; a traveling control unit configured to autonomously control a traveling of the vehicle based on the travel plan; and a warning light control unit configured to turn on a warning light earlier than a start time of a braking of the vehicle in the travel plan, the warning light informing a following vehicle about the braking.

12 Claims, 23 Drawing Sheets

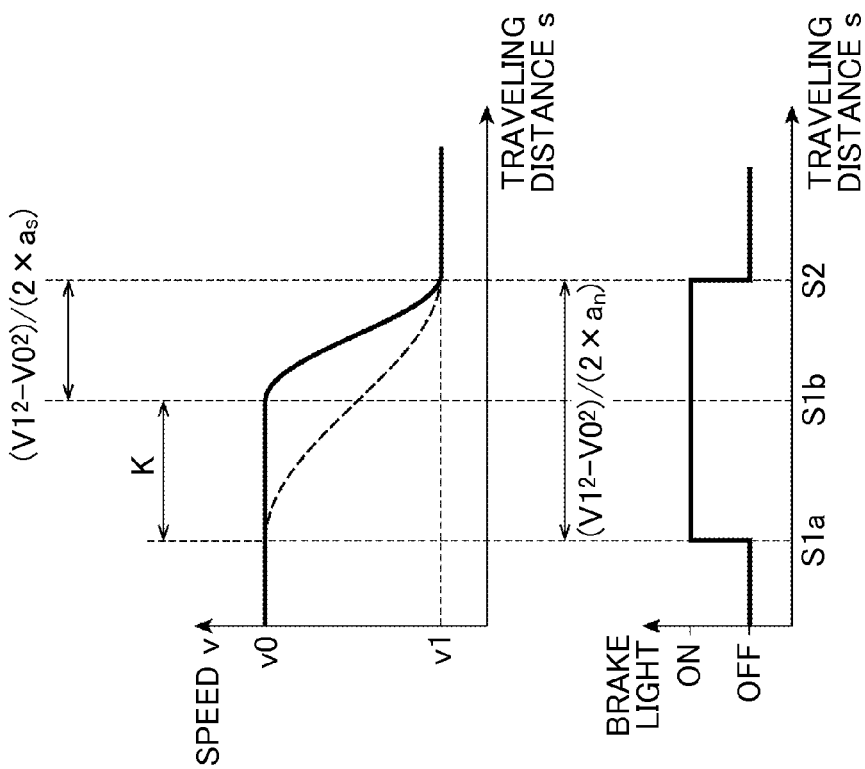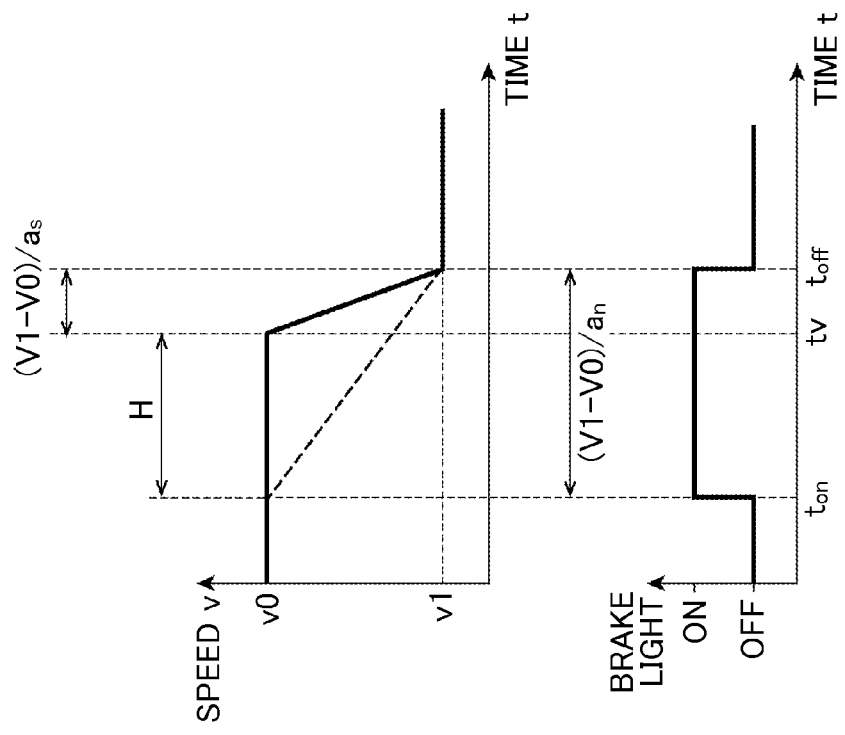

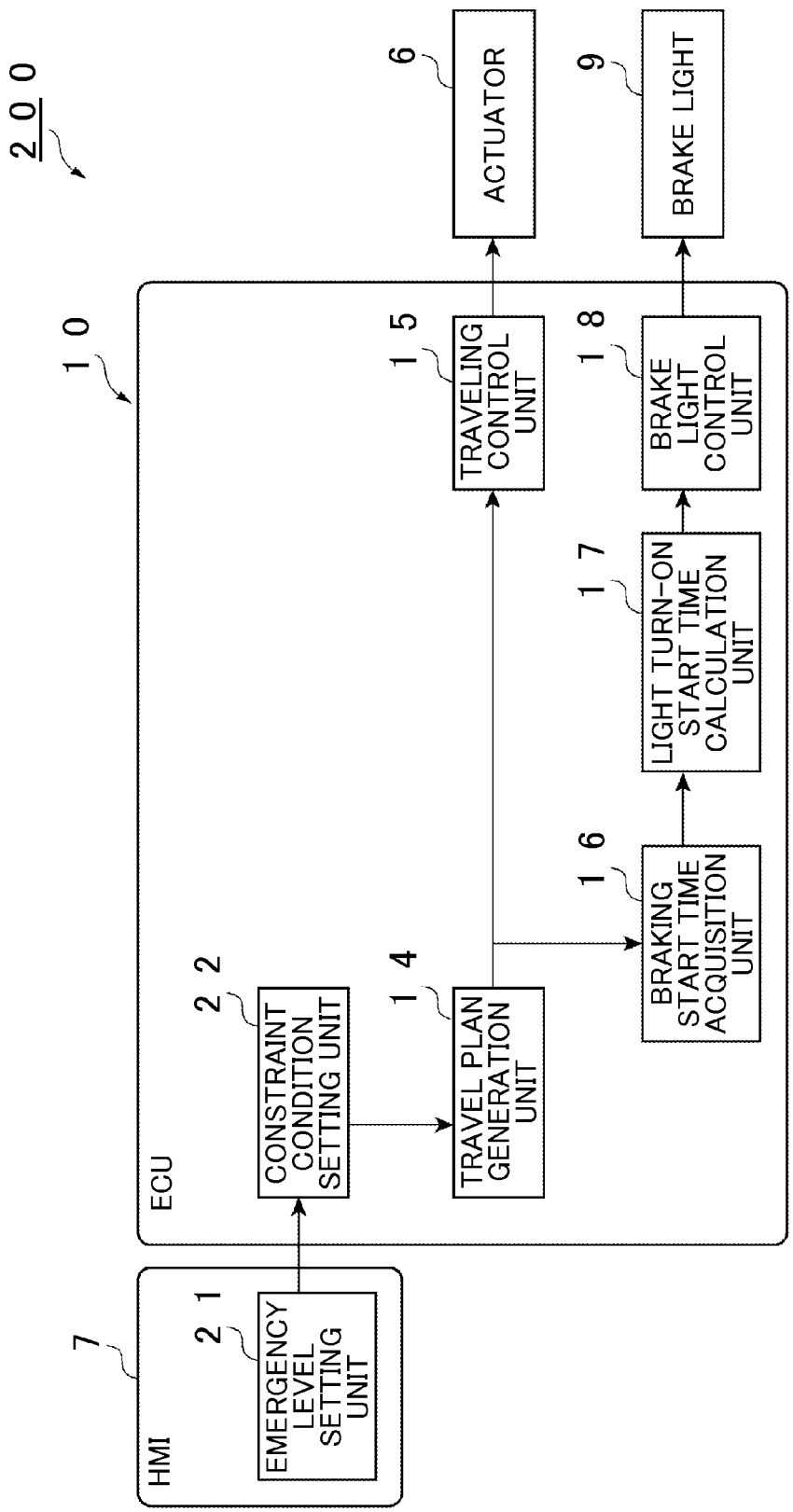

FIG. 7A

| EMERGENCY LEVEL | | |
|---|---|---|
| LOW | INTERMEDIATE | HIGH |
| LOW (EQUAL TO OR HIGHER THAN −0.15G AND LOWER THAN −0.1G) | INTERMEDIATE (EQUAL TO OR HIGHER THAN −0.3G AND LOWER THAN −0.15G) | HIGH (EQUAL TO OR HIGHER THAN −0.4G AND LOWER THAN −0.3G) |

MAXIMUM ALLOWABLE DECELERATION

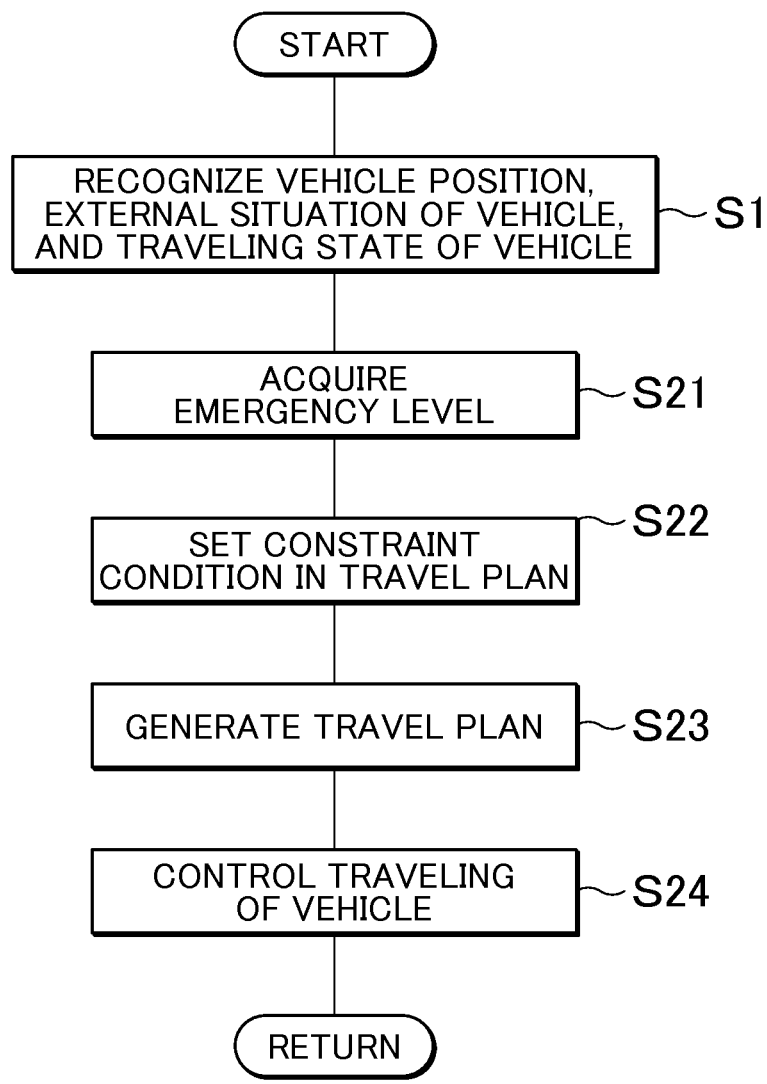

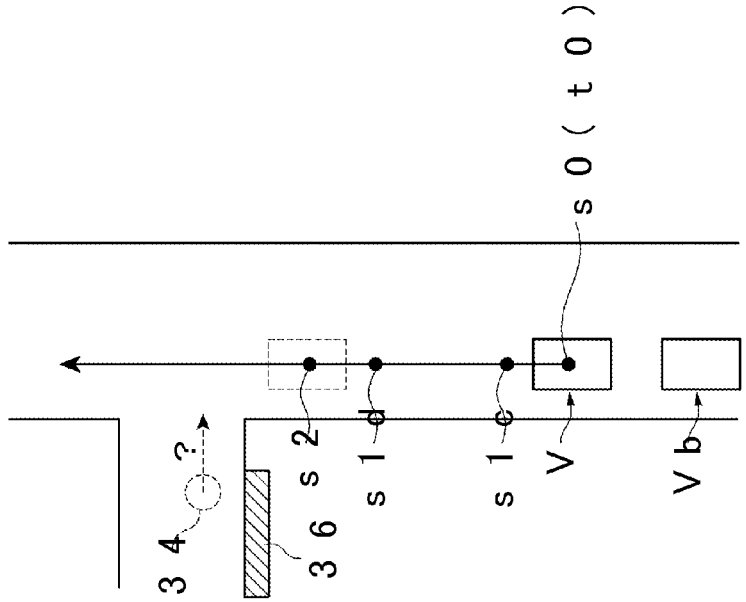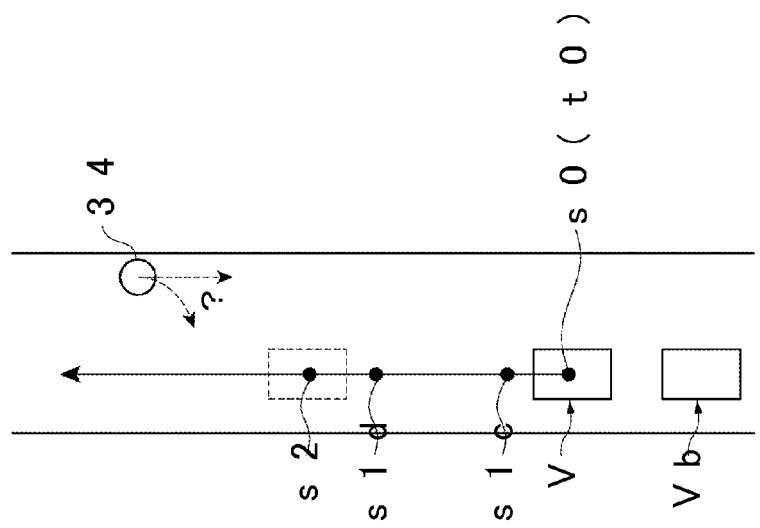

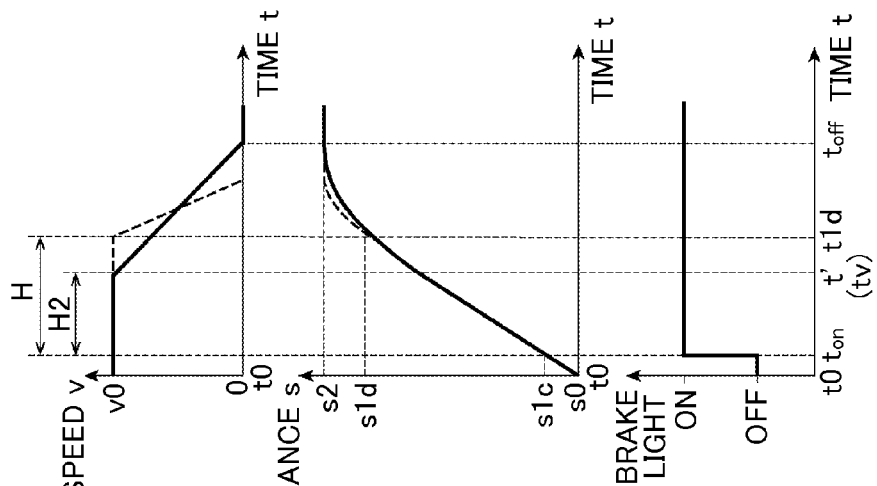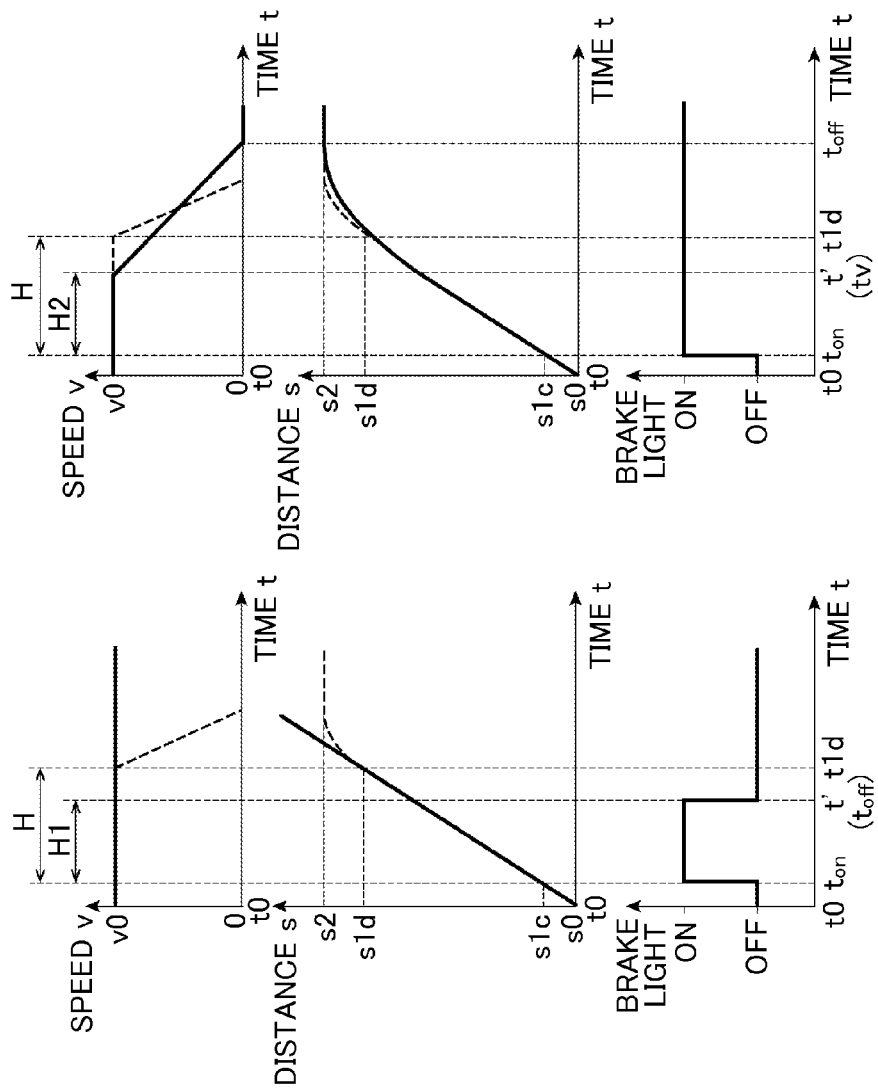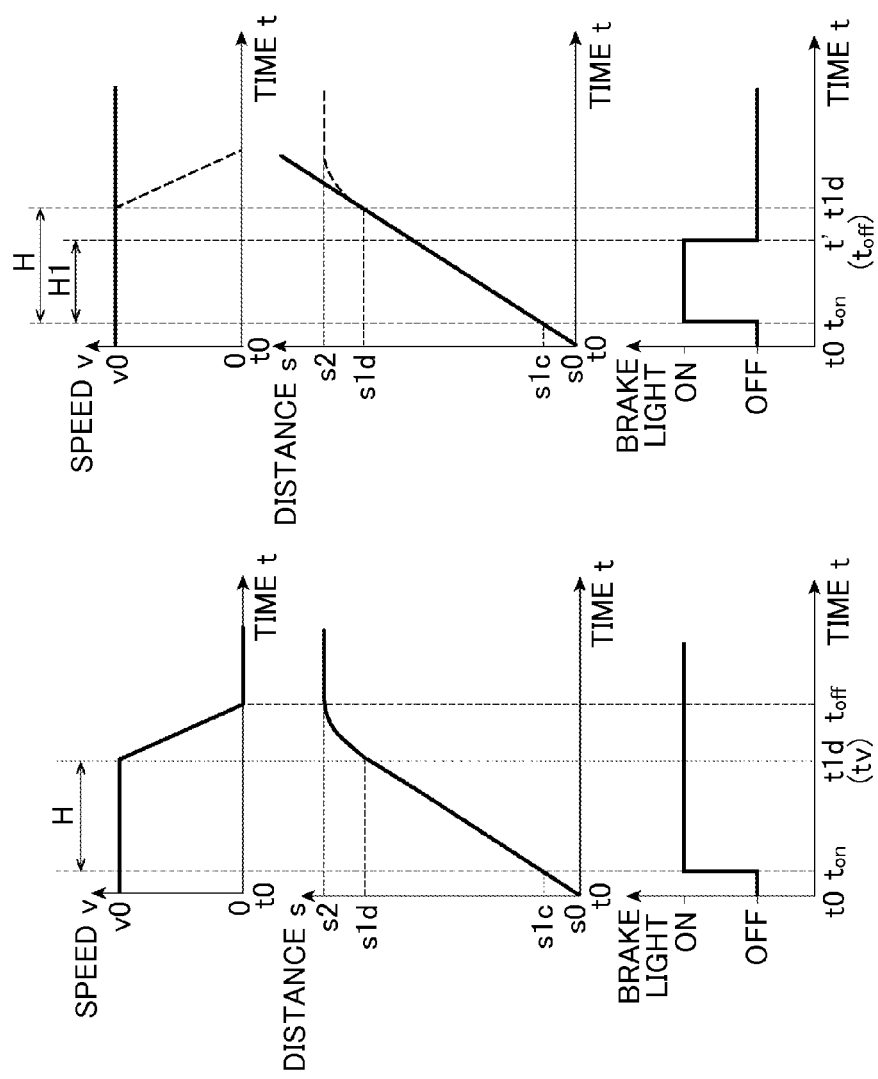

AUTONOMOUS DRIVING VEHICLE SYSTEM

INCORPORATION BY REFERENCE

The disclosure of Japanese Patent Application No. 2014-234582 filed on Nov. 19, 2014 including the specification, drawings and abstract is incorporated herein by reference in its entirety.

BACKGROUND OF THE INVENTION

1. Field of the Invention

The present invention relates to an autonomous driving vehicle system.

2. Description of Related Art

Conventionally, as described in Japanese Patent Application Publication No. 2014-085711 (JP 2014-085711 A), a brake control device is known that includes an arithmetic unit that calculates the time to collision based on the relative distance and the relative speed between the vehicle and a following vehicle and a warning unit that issues a warning to the following vehicle based on the comparison between the time to collision and the warning threshold.

According to the conventional technology described above, it may be difficult to know the distance and speed relative to the following vehicle, for example, when the vehicle turns right or left at an intersection or travels through a curve. This sometimes results in an inappropriate warning to the following vehicle. On the other hand, recent advances in the development of an autonomous driving vehicle make it possible to know more exactly the surrounding environment of the vehicle, leaving room for improvement in a warning to the following vehicle.

SUMMARY OF THE INVENTION

The present invention provides an autonomous driving vehicle system that can reduce the possibility of collision with a following vehicle.

An aspect of the invention is an autonomous driving vehicle system including: a surrounding information detection unit that is configured to detect surrounding information on a vehicle; and at least one electronic control unit. The electronic control unit includes: a travel plan generation unit configured to generate a travel plan along a pre-set target route based on the surrounding information and map information; a traveling control unit configured to autonomously control a traveling of the vehicle based on the travel plan; and a warning light control unit configured to turn on a warning light earlier than a start time of a braking of the vehicle in the travel plan, the warning light informing a following vehicle about the braking.

In the autonomous driving vehicle system in the above aspect, the warning light is turned on before the vehicle applies the brake to let the driver of a following vehicle know earlier that the vehicle will apply the brake. This can reduce the possibility of collision with the following vehicle.

The above aspect of the invention may include an emergency level setting unit configured to set an emergency level of traveling of the vehicle based on at least one of an input operation by an occupant of the vehicle and the surrounding information. The electronic control unit may include a maximum allowable deceleration setting unit configured to set a higher maximum allowable deceleration of the vehicle as the emergency level is higher. The maximum allowable deceleration is a maximum deceleration allowable during autonomous traveling. The travel plan generation unit may be configured to generate the travel plan in such a manner that a deceleration of the vehicle is equal to or lower than the maximum allowable deceleration.

According to the above configuration, because the braking tends to be applied with higher deceleration as the emergency level that is set is higher, it is preferable to signify the braking of the vehicle to the driver of the following vehicle early. In this case, the above-described effect that the possibility of collision with the following vehicle is reduced is remarkable.

In the above aspect of the invention, the electronic control unit may include: an obstacle information acquisition unit configured to acquire obstacle information on an obstacle ahead of the vehicle based on the surrounding information; and a collision possibility calculation unit configured to calculate a collision possibility that a moving obstacle and the vehicle collide ahead of the vehicle. The travel plan generation unit may be configured to generate the travel plan that performs a braking for avoiding collision with the moving obstacle when the collision possibility is equal to or higher than an upper limit threshold. The travel plan generation unit may be configured to generate the travel plan that does not perform the braking for avoiding collision with the moving obstacle when the collision possibility is equal to or lower than a lower limit threshold. The travel plan generation unit may be configured to generate the travel plan that performs a postponed braking as the braking for avoiding collision with the moving obstacle when the collision possibility is lower than the upper limit threshold and is higher than the lower limit threshold. The postponed braking is a braking in which a start of the braking is delayed as compared to a start of the braking performed when the collision possibility is equal to or higher than the upper limit threshold.

According to the above configuration, when it is determined that the collision possibility is lower than the upper limit threshold and is higher than the lower limit threshold, the vehicle travels autonomously according to a braking postponed travel plan that performs the postponed braking in which the start of the braking is delayed as compared to the start of the braking that is performed when the collision possibility is equal to or higher than the upper limit threshold. This allows the vehicle to travel without wasting the travel time.

In the above aspect of the invention, the surrounding information may include information on a width of a lane in which the vehicle is traveling and information on a position of an obstacle around the vehicle.

In the above aspect of the invention, the map information may include position information on a road, information on a road shape, and position information on an intersection and a junction.

In the above aspect of the invention, the map information may be recorded on a recording medium mounted in the vehicle.

In the above aspect of the invention, the map information may be supplied from a communication center, capable of communicating with the vehicle, to the vehicle.

In the above aspect of the invention, the electronic control unit may include a correction coefficient setting unit configured to set a correction coefficient based on the travel plan, the map information, and position information on the vehicle. The correction coefficient setting unit may be configured to set the correction coefficient to be larger when the vehicle is braked to turn right or left than when the vehicle is braked during travel straight ahead. The warning light control unit may be configured to turn on the warning light earlier than a braking start time of the vehicle by a time generated by multiplying a pre-set base time by the correction coefficient.

According to the above configuration, the light turn-on start time when the vehicle will turn right or left can be set earlier than the light turn-on start time when the vehicle will travel straight ahead.

In the above aspect of the invention, the electronic control unit may include a correction coefficient setting unit configured to set a correction coefficient based on the surrounding information on the vehicle. The correction coefficient setting unit may be configured to set the correction coefficient in such a manner that a correction coefficient for a braking when there is not a predetermined amount of traveling space, where a following vehicle can travel, lateral to the vehicle is larger than a correction coefficient for a braking when there is the predetermined amount of traveling space lateral to the vehicle. The warning light control unit may be configured to turn on the warning light earlier than a braking start time of the vehicle by a time generated by multiplying a pre-set base time by the correction coefficient.

According to the above configuration, the light turn-on start time when there is not a predetermined amount of traveling space to the side of the vehicle can be set earlier than the light turn-on start time when there is a predetermined amount of traveling space.

In the above aspect of the invention, the electronic control unit may include a correction coefficient setting unit configured to set a correction coefficient based on the surrounding information on the vehicle. The correction coefficient setting unit may be configured to set the correction coefficient for the braking of the vehicle in such a manner that the correction coefficient is larger as a time to collision of the vehicle to a following vehicle is shorter. The warning light control unit may be configured to turn on the warning light earlier than a braking start time of the vehicle by a time generated by multiplying a pre-set base time by the correction coefficient.

According to the above configuration, the light turn-on start time can be set earlier as the time to collision is shorter.

In the above aspect of the invention, the electronic control unit may include a correction coefficient setting unit configured to set a correction coefficient based on the surrounding information on the vehicle The correction coefficient setting unit may be configured to set the correction coefficient for the braking of the vehicle in such a manner that the correction coefficient is larger as a road surface friction coefficient of a road surface on which the vehicle travels is smaller. The warning light control unit may be configured to turn on the warning light earlier than a braking start time of the vehicle by a time generated by multiplying a pre-set base time by the correction coefficient.

According to the above configuration, the light turn-on start time can be set earlier as the road surface friction coefficient is smaller.

In the above aspect of the invention, the electronic control unit may include a correction coefficient setting unit configured to set a correction coefficient based on the surrounding information on the vehicle. The correction coefficient setting unit may be configured to set the correction coefficient for the braking of the vehicle in such a manner that the correction coefficient is larger as a visibility level of the vehicle is lower. The warning light control unit may be configured to turn on the warning light earlier than a braking start time of the vehicle by a time generated by multiplying a pre-set base time by the correction coefficient.

According to the above configuration, the light turn-on start time can be set earlier as the visibility gets worse either due to fog or rain or when the surrounding becomes dark.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a graph showing an example of the light turn-on start time calculated by a light turn-on start time calculation unit of the autonomous driving vehicle system shown in FIG. 1;

FIG. 3B is a graph showing another example of the light turn-on start time calculated by the light turn-on start time calculation unit of the autonomous driving vehicle system shown in FIG. 1;

FIG. 6 is a block diagram showing the ECU of an autonomous driving vehicle system in a second embodiment;

FIG. 7A is a diagram showing an example of a map stored in a constraint condition setting unit;

FIG. 7B is a flowchart showing the autonomous traveling processing of the autonomous driving vehicle system shown in FIG. 6;

FIG. 12A is a bird's-eye view showing brake light turn-on state transition in the autonomous driving vehicle system shown in FIG. 9;

FIG. 12B is another bird's-eye view showing brake light turn-on state transition in the autonomous driving vehicle system shown in FIG. 9;

FIG. 14A to FIG. 14C are graphs showing an example of brake light turn-on state transition when the collision possibility in the autonomous driving vehicle system shown in FIG. 9 is lower than the upper limit threshold and is higher than the lower limit threshold;

DETAILED DESCRIPTION OF EMBODIMENTS

Embodiments of the present invention are described in detail below with reference to the drawings. In the description below, the same reference numbers will be used to refer to the same or like components and redundant description will be omitted.

Figure 1:
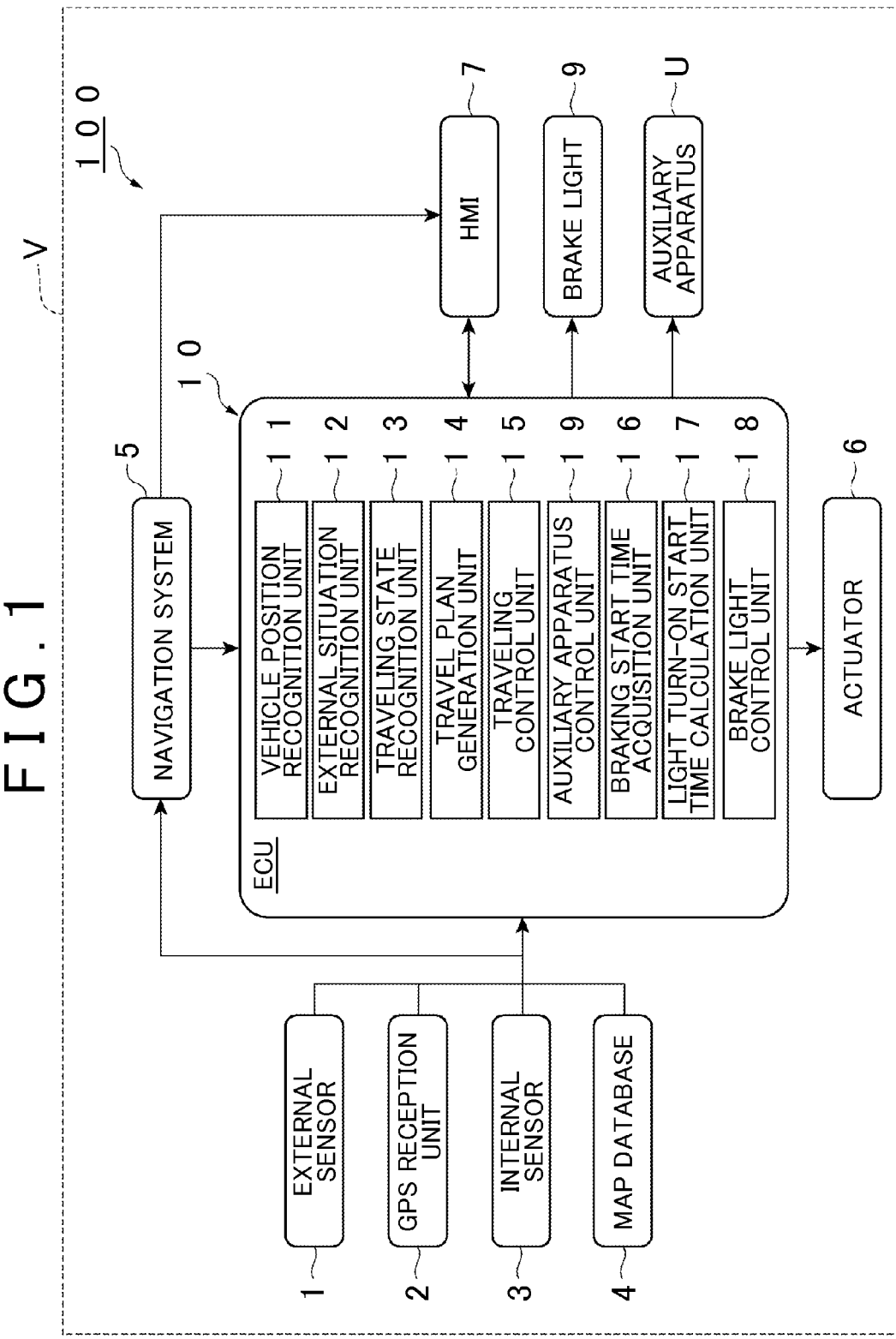
FIG. 1 is a block diagram showing a configuration of an autonomous driving vehicle system in a first embodiment.
Figure 2:
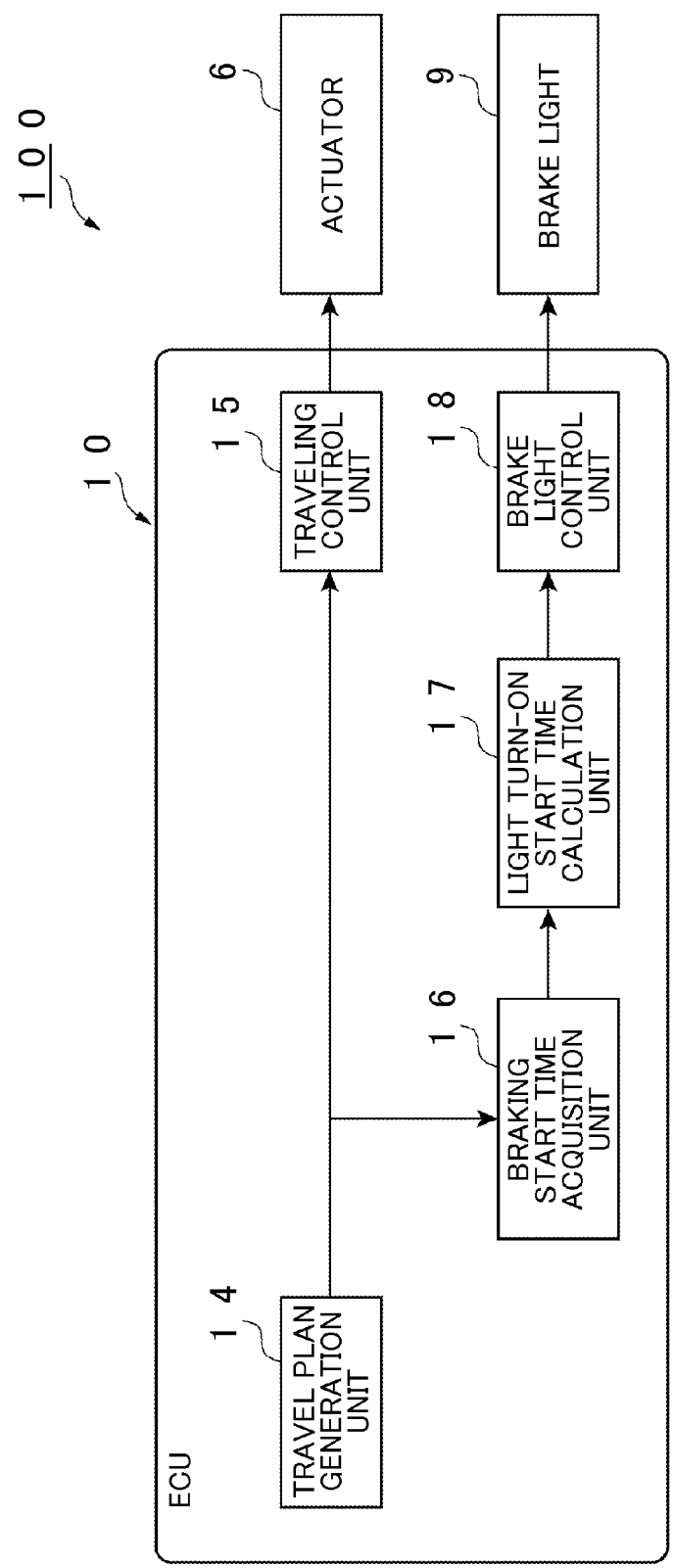
FIG. 2 is a block diagram showing the ECU of the autonomous driving vehicle system shown in FIG. 1.

A first embodiment is described below. FIG. 1 is a block diagram showing a configuration of an autonomous driving vehicle system 100 in the first embodiment. FIG. 2 is a block diagram showing an ECU 10 of the autonomous driving vehicle system 100 shown in FIG. 1. As shown in FIG. 1, the autonomous driving vehicle system 100 is mounted on a vehicle V such as a car. The autonomous driving vehicle system 100 includes an external sensor (surrounding information detection unit) 1, Global_Positioning_System (GPS) reception unit 2, an internal sensor 3, a map database 4, a navigation system 5, an actuator 6, an auxiliary apparatus U, an Electronic_Control_Unit (ECU) 10, and a Human_Machine_Interface (HMI) 7.

The external sensor 1 is a detection apparatus for detecting the external situation that is the surrounding information on the vehicle V. The external sensor 1 includes at least one of a camera, a radar, and a Laser_Imaging_Detection_and_Ranging (LIDER). The camera is a capturing apparatus that captures the external situation of the vehicle V.

The camera is provided, for example, on the interior side of the windshield of the vehicle V. The camera sends the captured information on the external situation of the vehicle V to the ECU 10. The camera may be a monocular camera or a stereo camera. The stereo camera includes two capturing units arranged so that the disparity between the right eye and the left eye can be reproduced. The information captured by the stereo camera also includes the depth information.

The radar detects an obstacle outside the vehicle V using a radio wave (for example, millimeter wave). The radar detects an obstacle by sending a radio wave to the surroundings of the vehicle V and receiving the radio wave reflected by an obstacle. The radar sends the detected obstacle information to the ECU 10. The LIDER detects an obstacle outside the vehicle V using light. When sensor fusion is performed in a subsequent stage, it is desirable that the reception information on a radio wave be sent to the ECU 10.

The LIDER detects an obstacle outside the vehicle V using light. The LIDER measures the distance to a reflection point and detects an obstacle by sending light to the outside of the vehicle V and receiving light reflected by the obstacle. The LIDER sends the detected obstacle information to the ECU 10. When sensor fusion is performed in a subsequent stage, it is desirable that the reception information on the reflected light be sent to the ECU 10. Two or more of the camera, LIDER, and radar need not necessarily be installed.

The GPS reception unit 2 receives signals from three or more GPS satellites to measure the position of the vehicle V (for example, the longitude and latitude of the vehicle V). The GPS reception unit 2 sends the measured position information on the vehicle V to the ECU 10. It should be noted that, instead of the GPS reception unit 2, another unit that can identify the longitude and latitude of the vehicle V may be used. The function to measure the direction of the vehicle V, if available, is desirable for use in comparison between the measured result of the sensor and the map information that will be described later.

The internal sensor 3 is a detection apparatus that detects the traveling state of the vehicle V. The internal sensor 3 includes at least one of a vehicle speed sensor, an acceleration sensor, and a yaw rate sensor. The vehicle speed sensor is a detection apparatus that detects the speed of the vehicle V. An example of the vehicle speed sensor is a wheel speed sensor that is provided on the wheels of the vehicle V or on the drive shaft that rotates in synchronization of the wheels to detect the rotation speed of the wheels. The vehicle speed sensor sends the detected vehicle speed information (wheel speed information) to the ECU 10.

The acceleration sensor is a detection apparatus that detects the acceleration of the vehicle V. For example, the acceleration sensor includes a longitudinal acceleration sensor that detects acceleration in the longitudinal direction of the vehicle V and a lateral acceleration sensor that detects the lateral acceleration of the vehicle V. For example, the acceleration sensor sends the acceleration information on the vehicle V to the ECU 10. The yaw sensor is a detection apparatus that detects the yaw rate (turning angle velocity) around the vertical axis at the center of gravity of the vehicle V. For example, a gyro sensor may be used as the yaw rate censor. The yaw rate sensor sends the detected yaw rate information on the vehicle V to the ECU 10.

The map database 4 is a database that stores map information. For example, the map database is formed in a hard disk drive (HDD) installed on the vehicle. The map information includes the position information on roads, the road shape information (road type indicating curved or straight part, curvature of a curve, etc.,), and position information on intersections and junctions. In addition, to use the position information on shielding structures such as a building or a wall and the Simultaneous_Localization_and_Mapping (SLAM) technology, it is desirable for the map information to include the output signal of the external sensor 1. The map database may also be stored in a computer in facilities, such as an information processing center, that can communicate with the vehicle V.

The navigation system 5 is a device that guides the driver of the vehicle V to the destination that is set by the driver of the vehicle V. The navigation system 5 calculates a route, on which the vehicle will travel, based on the position information on the vehicle V measured by the GPS reception unit 2 and the map information stored in the map database 4. The route may be a suitably identified lane in a multiple-lane area. The navigation system 5 calculates a target route from the position of the vehicle V to the destination and informs the driver about the target route through a display on the display or a voice output from the speaker. The navigation system 5 sends the information on the target route of the vehicle V to the ECU 10. The navigation system 5 may also be stored in a computer in facilities, such as an information processing center, that can communicate with the vehicle V.

The actuator 6 is a device that controls the traveling of the vehicle V. The actuator 6 includes at least a throttle actuator, a brake actuator, and a steering actuator. The throttle actuator controls the amount of air to be supplied to the engine (throttle angle) according to the control signal from the ECU 10 to control the driving force of the vehicle V. When the vehicle V is a hybrid vehicle or an electric vehicle, the actuator 6 does not include a throttle actuator and, in this case, the control signal is input from the ECU 10 to the motor, the source of power, to control the driving force.

The brake actuator controls the brake system according to the control signal from the ECU 10 to control the controlling force to be applied to the wheels of the vehicle V. As a brake system, a hydraulic brake system may be used. The steering actuator controls the driving of the assist motor, one component of the electric power steering system for controlling the steering torque, according to the control signal from the ECU 10. Based on this signal, the steering actuator controls the steering torque of the vehicle V.

The auxiliary apparatus U is an apparatus usually operable by the driver of the vehicle V. The auxiliary apparatus U generically refers to the apparatuses not included in the actuator 6. The auxiliary apparatus U mentioned here includes the direction indicator lights, headlights, and windshield wipers.

As shown in FIG. 1 and FIG. 2, the ECU 10 controls the autonomous traveling of the vehicle V. The ECU 10 is an electronic control unit that includes a Central_Processing_Unit (CPU), a Read_Only_Memory (ROM), and a Random_Access_Memory (RAM). The ECU 10 loads a program, stored in the ROM, into the RAM for execution by the CPU to perform various types of control operations. The ECU 10 may be configured by a plurality of electronic control units.

The ECU 10 includes a vehicle position recognition unit 11, an external situation recognition unit 12, a traveling state recognition unit 13, a travel plan generation unit 14, a traveling control unit 15, an auxiliary apparatus control unit 19, a braking start time acquisition unit 16, a light turn-on start time calculation unit 17, and a brake light control unit (warning light control unit) 18.

The vehicle position recognition unit 11 recognizes the position of the vehicle V (hereinafter called "vehicle position") on the map based on the position information on the vehicle V received by the GPS reception unit 2 and the map information stored in the map database 4. The vehicle position recognition unit 11 may also recognize the vehicle position by acquiring the vehicle position, which will be used by the navigation system 5, from the navigation system 5. When the vehicle position of the vehicle V can be measured by a sensor installed outside the vehicle, for example, by a sensor installed on the road, the vehicle position may be acquired from this sensor via communication.

The external situation recognition unit 12 recognizes the external situation of the vehicle V based on the detection result of the external sensor 1 (for example, information captured by the camera, obstacle information collected by the radar, and obstacle information collected by LIDER). The external situation includes the following: the positions of the white lines of the traveling lane in which the vehicle V travels or the position of the center of the lane and the road width, the road shape (for example, the curvature of the traveling lane, a change in the slope of the road surface and undulations efficiently used for the prospect estimation by the external sensor 1), and situations of obstacles around the vehicle V (for example, information for distinguishing between non-moving obstacle and moving obstacle, the position of an obstacle around the vehicle V, moving direction of an obstacle around the vehicle V, and relative speed of an obstacle around the vehicle V). It is preferable to compare the detection result of the external sensor 1 and the map information to increase accuracy in the position and direction of the vehicle V acquired by the GPS reception unit 2.

The traveling state recognition unit 13 recognizes the traveling state of the vehicle V based on the detection result of the internal sensor 3 (vehicle speed information detected by the vehicle speed sensor, acceleration information detected by the acceleration sensor, yaw rate information detected by the yaw rate sensor, etc.,). For example, the traveling state of the vehicle V includes the vehicle speed, acceleration, and yaw rate.

The travel plan generation unit 14 generates a course of the vehicle V based on the target route calculated by the navigation system 5, the vehicle position recognized by the vehicle position recognition unit 11, and the external situation (including the vehicle position and direction) of the vehicle V recognized by the external situation recognition unit 12. The course is a locus along which the vehicle V will travel on the target route. The travel plan generation unit 14 generates a course so that the vehicle V travels smoothly on the target route from the viewpoint of safety, regulation compliance, and traveling efficiency. In this case, the travel plan generation unit 14, of course, generates a course of the vehicle V in such a manner that the vehicle V will avoid contact with an obstacle based on the situation of the obstacles around the vehicle V.

The target route mentioned here includes a traveling route generated automatically based on the external situation and the map information when the destination is not explicitly specified by the driver. An example of such a traveling route is a road-following route in the "driving assistance device" described in Japanese Patent No. 5382218 (WO2011/158347) or in the "autonomous driving device" described in Japanese Patent Application Publication No. 2011-162132 (JP 2011-162132 A).

The travel plan generation unit 14 generates a travel plan according to a generated course. That is, the travel plan generation unit 14 generates a travel plan along the pre-set target route, based at least on the external situation that is the surrounding information on the vehicle V and the map information stored in the map database 4. Preferably, the travel plan generation unit 14 outputs a generated travel plan in a form in which a course of the vehicle V is represented by a plurality of sets, or configuration coordinates (p, v), each composed of two elements, the target position p and the speed v at each target point, in a coordinate system of which the origin is fixed to the vehicle V. Each target position p at least has the information on the positions of the x-coordinate and y-coordinate in the coordinate system or the information equivalent to that information. A travel plan is not limited to a specific form as long as the plan indicates the behavior of the vehicle V. For example, in a travel plan, the target time t may be used in place of the speed v or the target time t and the direction of the vehicle V at that time may be added.

Normally, a travel plan is represented by data indicating the future that is approximately several seconds from the current time. However, because several tens of seconds of data is required depending upon a situation, for example, when the vehicle will turn right at an intersection or the vehicle will pass another vehicle, it is desirable that the number of configuration coordinates of a travel plan be variable and that the distance between configuration coordinates be variable. In addition, the curve joining the configuration coordinates may be approximated by a spline function and the parameters of that curve may be used as a travel plan. To generate a travel plan, any known method that can describe the behavior of the vehicle V may be used.

A travel plan may be represented by data indicating a change in the vehicle speed, acceleration/deceleration, and steering torque of the vehicle V that are applied when the vehicle V travels in a course along the target route. A travel plan may include a speed pattern, acceleration/declaration pattern, and steering pattern of the vehicle V. The travel plan generation unit 14 described above may generate a travel plan so that the travel time (time required for the vehicle V to reach the destination) is minimized.

Incidentally, the speed pattern refers to data composed of target vehicle speeds each of which is set associated with the time at each of the target control positions that are set on the course at a predetermined interval (for example, 1 m). The acceleration/deceleration pattern refers to data composed of target acceleration/deceleration values each of which is set associated with the time at each of the target control positions that are set on the course at a predetermined interval (for example, 1 m). The steering pattern refers to data composed of target steering torques each of which is set associated with the time at each of the target control positions that are set on the course at a predetermined interval (for example, 1 m).

The traveling control unit 15 autonomously controls the traveling of the vehicle V based on the travel plan generated by the travel plan generation unit 14. The traveling control unit 15 outputs the control signal, generated according to the travel plan, to the actuator 6. By outputting the control signal in this manner, the traveling control unit 15 controls the traveling of the vehicle V so that the vehicle V travels autonomously according to the travel plan. The auxiliary apparatus control unit 19 integrates the signal, output by the HMI 7, into the travel plan, generated by the travel plan generation unit 14, to control the auxiliary apparatus U.

The braking start time acquisition unit 16 acquires the braking start time of the vehicle V from the travel plan generated by the travel plan generation unit 14. The braking start time acquisition unit 16 determines whether the braking will be performed in the future based on the travel plan and, if the braking is performed in the future, acquires the start time of the braking. More specifically, if it is predicted from the travel plan that, in the future, the vehicle V will perform deceleration that involves braking after acceleration or constant-speed traveling, the braking start time acquisition unit 16 acquires the time to start the braking as the braking start time. The constant-speed traveling includes slow deceleration equal to that applied by engine braking. The future refers to the duration from the current time to several seconds after that.

For example, if the travel plan is represented as shown below as an array composed of target vehicle motion states, arranged at a predetermined interval, from the time $T_{start}$, which is a time after the current time, to the time $T_{end}$, which is several seconds after that, the braking in the future means that the target vehicle motion state at $X_{start}$ does not correspond to the braking and that at least one of the target vehicle motion states from $X_{start+1}$ to $X_{end}$ corresponds to the braking. Examples of the braking in the future include the braking applied when the vehicle enters a curve, turns right or left at an intersection, and stops at a stop sign. Array of target vehicle motion states=$(X_{start}, X_{start+1}, X_{start+2}, \ldots, X_{end-2}, X_{end-1}, X_{end})$ The light turn-on start time calculation unit 17 calculates a light turn-on start time earlier than the braking start time acquired by the braking start time acquisition unit 16. The light turn-on start time is the time at which the lighting of brake lights 9 is started. The brake light 9 is a warning light that, when turned on, notifies the following vehicle that the vehicle V will apply the brakes. The brake lights 9 are provided on the rear of the vehicle V. The brake lights 9, connected to the brake system, are turned upon receiving the turn-on command from the brake system at a braking time when the vehicle V actually applies the brakes. The following describes the method performed by the light turn-on start time calculation unit 17 for calculating a light turn-on start time.

FIG. 3A is a graph showing an example of a light turn-on start time calculated by the light turn-on start time calculation unit 17. In the figure, the broken wavy line indicates the braking time with the standard deceleration $a_n$, and the solid wavy line indicates the braking time in the travel plan. As shown in FIG. 3A, the light turn-on start time $t_{on}$ is a time that is earlier than the braking start time $t_v$, predicted by the braking start time acquisition unit 16, by the lead time H. The lead time H is calculated in such a manner that the lead time becomes longer as the deceleration of braking is larger. That is, the light turn-on start time $t_{on}$ is calculated in such a manner that the light turn-on start time becomes earlier than the braking start time $t_v$ as the deceleration of braking is larger.

In the example shown in FIG. 3A, the braking in the travel plan is a braking in which the vehicle V, which travels at a constant speed of the vehicle speed v0, decelerates with a deceleration of $a_s$ from the braking start time $t_v$ and the vehicle V speed becomes v1 at the braking end time $t_{off}$. The light turn-on start time $t_{on}$ is calculated relative to the braking end time $t_{off}$ in such a manner that the brake lights 9 remain turned on for the same time length as that for the braking duration required to decelerate to the vehicle speed v1 with a standard deceleration $a_n$. The standard deceleration $a_n$ is a slow deceleration. As the standard deceleration $a_n$, the range from 0.15G to −0.1G is assumed, where G denotes the gravitational acceleration.

The lead time H is represented by expression (1) below in which the braking duration $((v1-v0)/a_s)$ at the braking time in the travel plan is subtracted from the braking duration $((v1-v0)/a_n)$ at the braking time during which the vehicle decelerates with the standard deceleration $a_n$. The light turn-on start time $t_{on}$ is calculated so that the light turn-on start time becomes earlier than the braking start time $t_v$ by the lead time H.

$$H=(v1-v0)/a_n-(v1-v0)/a_s \qquad (1)$$

where, v0 is the vehicle speed before braking, v1 is the vehicle speed after braking, $a_s$ is the deceleration at braking time in the travel plan, and $a_n<0$, $a_s<0$, and $a_s<a_n$.

FIG. 3B is a graph showing another example of the light turn-on start time calculated by the light turn-on start time calculation unit 17. In the figure, the broken wavy line indicates the braking time with the standard deceleration $a_n$, and the solid wavy line indicates the braking time in the travel plan. As shown in FIG. 3B, the light turn-on start time $t_{on}$ can also be calculated by first calculating the light turn-on position s1a located nearer to the current position than the braking start position s1b in the travel plan and, then, calculating the time at which the vehicle V will reach this light turn-on position s1a.

In the example shown in FIG. 3B, the braking in the travel plan is a braking in which the vehicle V, which travels at a constant speed of the vehicle speed v0, starts decelerating at the braking start position s1b with the deceleration $a_s$ and the vehicle speed becomes v1 at the braking end position s2. The light turn-on position s1a is the position located nearer to the current position than the braking start position s1b by the lead distance K. The light turn-on position s1a is calculated as the position located nearer to the current position than the braking end position s2 by the same distance as the braking distance for which the braking is performed with the standard deceleration $a_n$. The time at which the vehicle V will reach this light turn-on position s1a is calculated as the light turn-on start time $t_{on}$.

The lead distance K is represented by expression (2) below in which the braking distance $((v1^2-v0^2)/(2\times a_s))$ at the braking time in the travel plan is subtracted from the braking distance $((v1^2-v0^2)/(2\times a_n))$ at the braking time for which the braking is performed with the standard deceleration $a_n$.

$$K=(v1^2-v0^2)/(2\times a_n)-(v1^2-v0^2)/(2\times a_s) \qquad (2)$$

The brake light control unit 18 controls the brake lights 9 so that the brake lights 9 are turned on from the light turn-on start time $t_{on}$ calculated by the light turn-on start time calculation unit 17. When the current time reaches the light turn-on start time $t_{on}$, the brake light control unit 18 outputs the light turn-on command, which starts turning on the lights, to the brake lights 9. This command causes the brake lights 9 to turn on from the light turn-on start time $t_{on}$. It is also desirable that the light turn-on method for the brake lights 9 from the light turn-on start time $t_{on}$ to the braking start time $t_v$ be different from the light turn-on method for the brake lights 9 from the braking start time $t_v$ to the braking end time $t_{off}$. The light turn-on methods may be made different from each other, for example, by blinking the brake lights 9, by changing the light intensity of the brake lights 9, or by changing the light distribution pattern (pattern of light direction). When different light turn-on methods are used, it is also desirable that, as the time goes from the light turn-on start time $t_{on}$ to the braking start time $t_v$, the light turn-on method be gradually changed to the light turn-on method that is used at or after the braking start time $t_v$. More specifically, when blinking the brake lights 9, the brake lights 9 are controlled so that the ratio between the on-state and the off-state of the blinking is gradually changed such that the on-state becomes longer. When changing the light intensity of the brake lights 9, the brake lights 9 are controlled so that the light turn-on intensity becomes gradually close to the light turn-on light intensity at or after the braking start time $t_v$.

The HMI 7 is the interface for outputting and inputting information between the occupants (including the driver) of the vehicle V and the autonomous driving vehicle system 100. The HMI 7 has a display panel for displaying image information to the occupants, a speaker for outputting voices, and operation buttons or a touch panel for allowing the occupants to perform input operations. When an occupant performs an input operation to start or stop autonomous traveling, the HMI 7 outputs the signal to the ECU 10 to start or stop the autonomous traveling. When the vehicle reaches the destination where autonomous driving is to be terminated, the HMI 7 informs the occupants that the vehicle will reach the destination. The HMI 7 may use a wirelessly connected mobile information terminal to output information to the occupants or may receive an input operation from an occupant using a mobile information terminal. The HMI 7 may directly control the auxiliary apparatus U based on an occupant operation not via the auxiliary apparatus control unit 19.

Next, the processing performed by the autonomous driving vehicle system 100 is described in detail with reference to the flowcharts shown in FIGS. 4A and 4B.

Figure 4A:
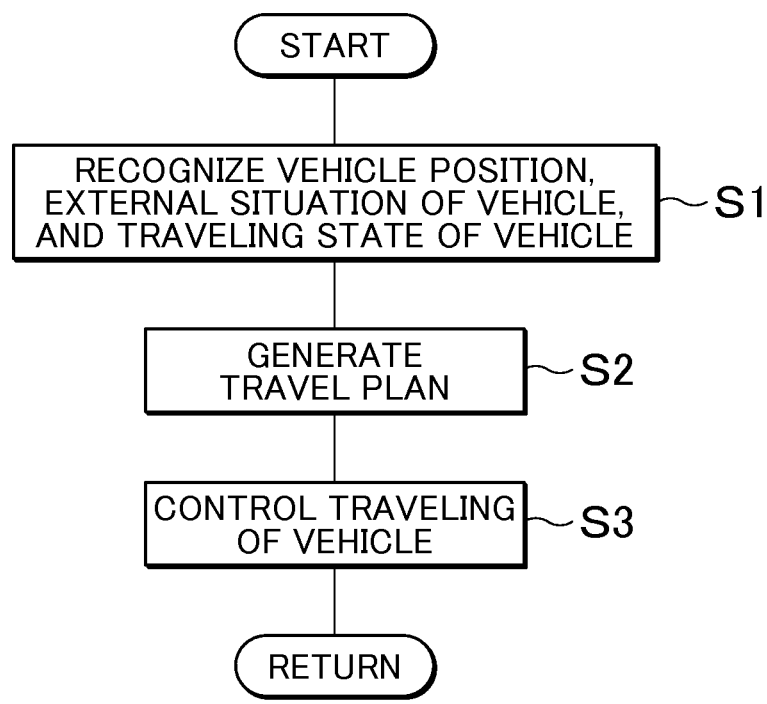
FIG. 4A is a flowchart showing the autonomous traveling processing of the autonomous driving vehicle system shown in FIG. 1.

FIG. 4A is a flowchart showing the autonomous traveling processing of the autonomous driving vehicle system 100. In the autonomous driving vehicle system 100, when the driver sets a destination via the navigation system 5 and performs an input operation through the HMI 7 for starting the autonomous traveling, the ECU 10 performs the autonomous traveling processing, described below, repeatedly at a predetermined periodic processing interval.

First, the vehicle position recognition unit 11 recognizes the vehicle position from the position information on the vehicle V, received by the GPS reception unit 2, and the map information stored in the map database 4. The external situation recognition unit 12 recognizes the external situation of the vehicle V from the detection result of the external sensor 1. The traveling state recognition unit 13 recognizes the traveling state of the vehicle V from the detection result of the internal sensor 3 (S1). The travel plan generation unit 14 generates a travel plan of the vehicle V from the target route calculated by the navigation system 5, the vehicle position, the external situation of the vehicle V, and the traveling state of the vehicle V (S2).

The traveling control unit 15 controls the traveling of the vehicle V so that the vehicle V travels according to the generated travel plan (S3). Then, the processing proceeds to the autonomous traveling processing in the next cycle. The autonomous traveling is terminated when the vehicle V reaches the destination as a result of this autonomous traveling processing or when the driver specifies, via the HMI 7, an input operation to stop the autonomous traveling during the traveling processing.

Figure 4B:
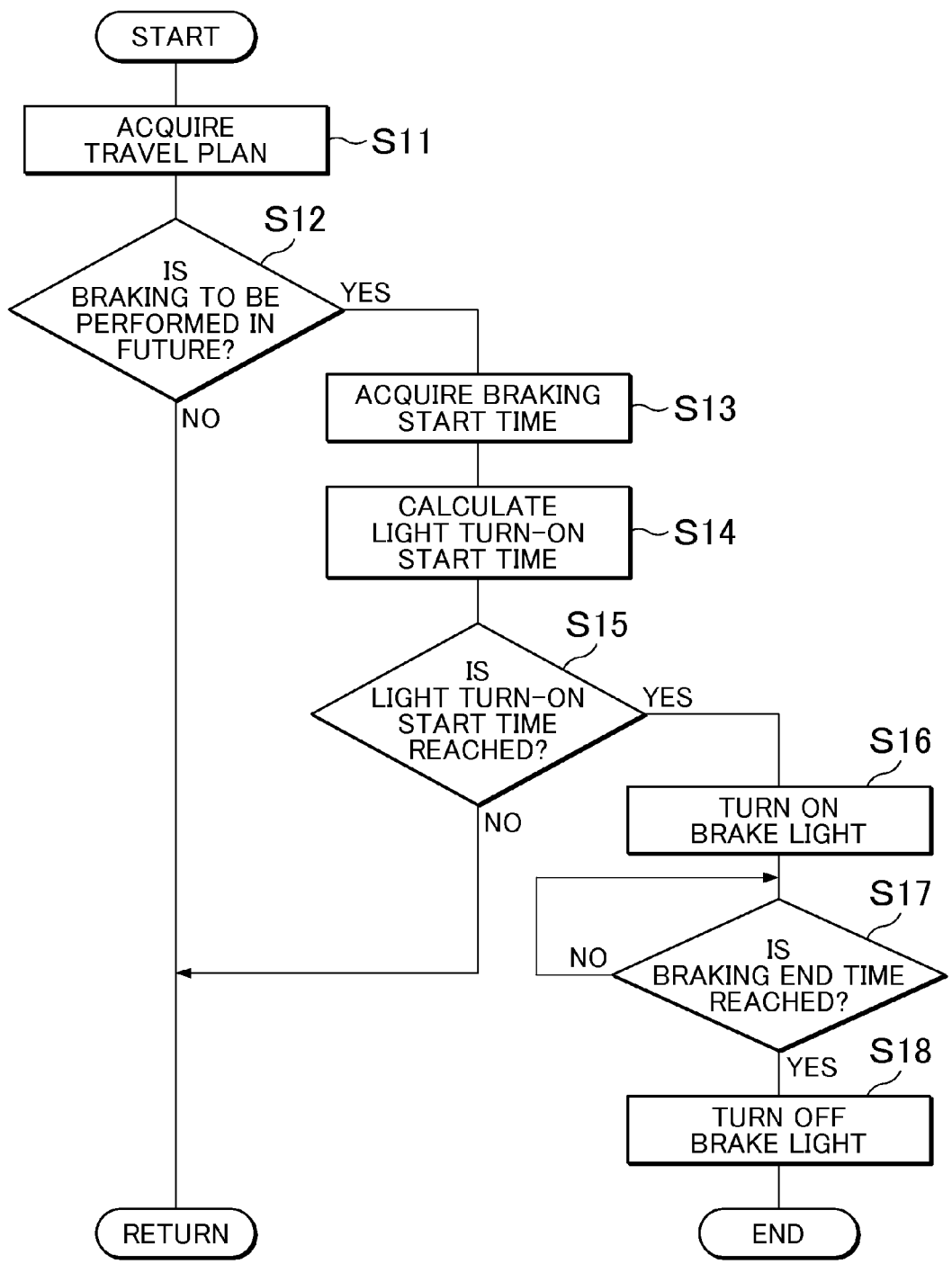
FIG. 4B is a flowchart showing the brake light turn-on processing of the autonomous driving vehicle system shown in FIG. 1.

FIG. 4B is a flowchart showing the brake light turn-on processing of the autonomous driving vehicle system 100. In the autonomous driving vehicle system 100, when autonomous traveling is performed by the autonomous traveling processing described above, the ECU 10 performs the brake light turn-on processing, described below, repeatedly at a predetermined periodic processing interval.

First, the braking start time acquisition unit 16 acquires the travel plan from the travel plan generation unit 14 (S11). The braking start time acquisition unit 16 determines, based on the travel plan, whether the braking will be applied in the future (S12). If it is determined that the braking will be applied in the future, the braking start time acquisition unit 16 acquires the braking start time $t_v$ from the travel plan (S13). The light turn-on start time calculation unit 17 calculates the light turn-on start time $t_{on}$ that is earlier than the braking start time $t_v$ (S14). The brake light control unit 18 determines whether the current time has reached the light turn-on start time $t_{on}$ (S15).

If it is determined in S15 described above that the current time has reached the light turn-on start time $t_{on}$, the brake light control unit 18 outputs the light turn-on command, which starts turning on the lights, to the brake lights 9 to turn on the brake lights 9 (S16). After that, when the braking start time $t_v$ has reached and the traveling control unit 15 causes the vehicle to actually apply the brake, the brake lights 9 remain turned to indicate that the braking is applied. When the braking end time $t_{off}$ has reached and the braking of the vehicle V is ended, the brake lights 9 are turned off to indicate that the braking is ended and the brake light turn-on processing is terminated (S17, S18). On the other hand, if it is not determined in S12 described above that the braking will be applied in the future or if it is not determined in S15 described above that the current time has reached the light turn-on start time $t_{on}$, the processing proceeds to the brake light turn-on processing in the next cycle.

Figure 5B:
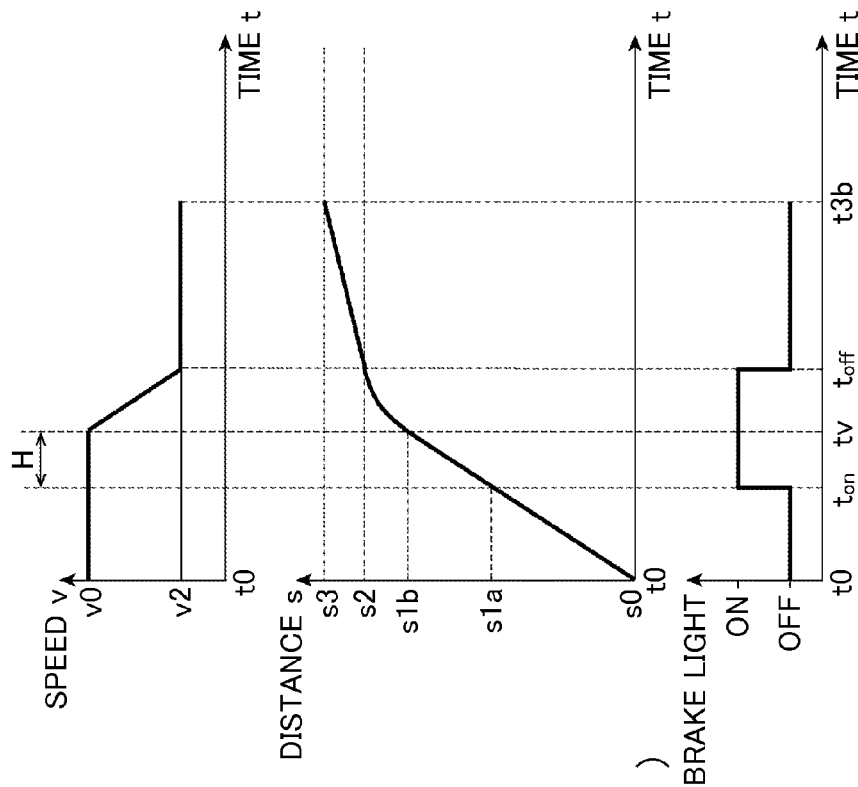
FIG. 5B is a graph showing an example of brake light turn-on state transition in the autonomous driving vehicle system shown in FIG. 1.

Next, an example of the light turn-on state transition of the brake lights 9 in the autonomous driving vehicle system 100 is described with reference to FIGS. 5A and 5B. In the description below, an example of the light turn-on state of the brake lights 9 when the vehicle V turns left at an intersection during autonomous traveling is described.

Figure 5A:
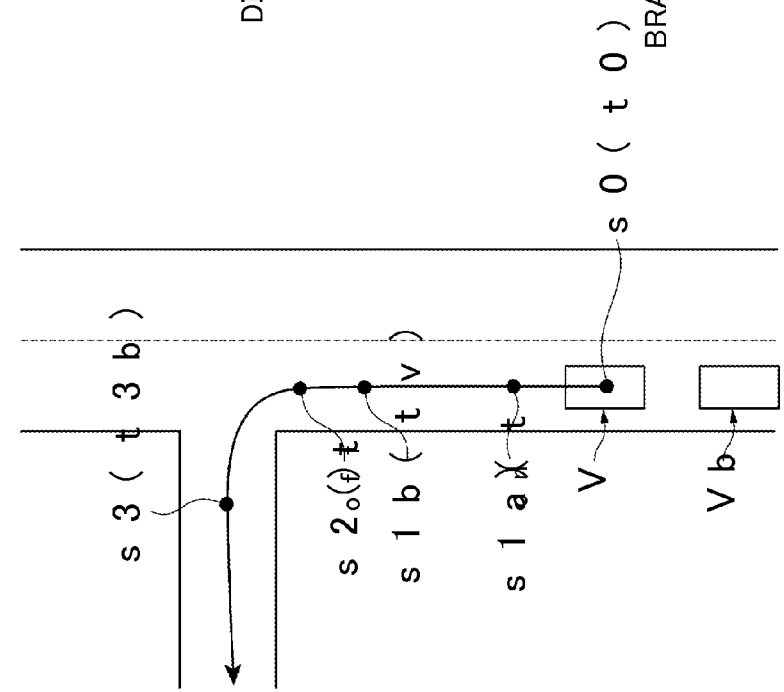
FIG. 5A is a bird's-eye view showing an example of brake light turn-on state transition in the autonomous driving vehicle system shown in FIG. 1.

FIG. 5A is a bird's-eye view of the vehicle V showing an example of the turn-on state transition of the brake lights 9. FIG. 5B is a graph showing an example of the turn-on state transition of the brake lights 9. As shown in FIG. 5A, there is a following vehicle Vb that follows the vehicle V. In the travel plan shown in the figure, the vehicle V passes the position s0 at the time t0 at a vehicle speed of v0 and decelerates from the braking start position s1b corresponding to the braking start time $t_v$ to the braking end position s2 corresponding to the braking end time $t_{off}$ with the deceleration $a_s$. After that, the vehicle V turns left at the intersection at the vehicle speed v2 and passes the position s3.

When the vehicle V travels autonomously according to this travel plan, the brake lights 9 are started to be turned on (ON) in the autonomous driving vehicle system 100 from the light turn-on start time $t_{on}$ that is earlier than the braking start time $t_v$ by the lead time H. After that, when the vehicle V actually applies the brake from the braking start time $t_v$, the brake lights 9 remain turned on and, when the braking end time $t_{off}$ of the braking is reached, are turned off (OFF).

In the autonomous driving vehicle system 100 in this embodiment, if it is known that the vehicle V will apply the brake in the future when the vehicle V travels autonomously according to a travel plan, the brake lights 9 are turned on before the vehicle V applies the brake in order to issue a warning, which indicates that the vehicle V will apply the brake, to the following vehicle Vb. This warning allows the driver of the following vehicle Vb to know earlier that the vehicle V will apply the brake. In other words, by setting the light turn-on start time $t_{on}$ of the brake lights 9 earlier than the actual braking start time $t_v$, a braking alert to the following vehicle Vb can be issued in advance. This reduces the possibility of collision with the following vehicle Vb (rear collision). In addition, this allows the brake lights 9 to be turned on earlier while reducing the traveling time (compatibility between efficient traveling and a reduction in the possibility of rear collision is ensured), thus increasing safety.

Next, a second embodiment is described. In the description of this embodiment, only the parts differing from those in the first embodiment are described.

FIG. 6 is a block diagram showing the ECU 10 of an autonomous driving vehicle system 200 in the second embodiment. As shown in FIG. 6, the autonomous driving vehicle system 200 in this embodiment differs from that in the first embodiment in that the HMI 7 includes an emergency level setting unit 21 and that the ECU 10 includes a constraint condition setting unit (maximum allowable deceleration setting unit) 22.

The emergency level setting unit 21 is used to set the emergency level of the traveling of the vehicle V. The emergency level is an urgency level at which the vehicle V must reach the destination as quickly as possible. The higher the emergency level is, the shorter the traveling time is, and the lower the emergency level is, the longer the traveling time is. The emergency level is set to "high" when the vehicle V is an emergency vehicle or when an occupant wants to reach the destination as quickly as possible. The emergency level may be switched among a plurality of modes (for example, switching among "high", "intermediate", and "low"). The emergency level may be set as a continuous value (for example, a value in the range 0 to 1) and, in this case, the larger the value is, the higher the emergency level is.

The emergency level setting unit 21 sets the emergency level based on an occupant's input operation via the operation buttons of the HMI 7 or the touch panel. An input device other than the HMI 7 may also be used as the emergency level setting unit 21 and, in this case, the emergency level is set via the dial operation or the lever operation. When a target arrival time to the destination is set on the navigation system 5, the emergency level setting unit 21 may automatically calculate and set the emergency level according to the target arrival time. In this case, the emergency level is set based on the input operation on the navigation system 5 and, therefore, the input operation on the HMI 7 is not necessary.

The constraint condition setting unit 22 sets a constraint condition for a travel plan, generated by the travel plan generation unit 14, in such a manner that the condition is relaxed as the emergency level, set by the emergency level setting unit 21, is higher. The constraint condition includes the maximum deceleration and the maximum acceleration allowable in the travel plan. More specifically, the constraint condition setting unit 22 sets the maximum deceleration allowable at least in the travel plan (hereinafter called "maximum allowable deceleration") in such a manner that the maximum allowable deceleration becomes higher as the emergency level becomes higher. In other words, as the emergency level is higher, the constraint condition setting unit 22 sets a higher maximum allowable deceleration of the vehicle V that is allowable during autonomous traveling.

FIG. 7A is a diagram showing an example of a map stored in the constraint condition setting unit 22. As shown in FIG. 7A, the constraint condition setting unit 22 has a map in which a constraint condition is associated with a pre-set emergency level. By referencing this map, the constraint condition setting unit 22 sets a constraint condition based on an emergency level that is set by the emergency level setting unit 21. In the map exemplified in FIG. 7A, when the emergency level is "low", the maximum allowable deceleration is "low" with its range being equal to or larger than −0.15G and smaller than −0.1G. When the emergency level is "intermediate" that is higher than "low", the maximum allowable deceleration is "intermediate" that is higher than "low" with its range being equal to or larger than −0.3G and smaller than −0.15G. When the emergency level is "high" that is higher than "intermediate", the maximum allowable deceleration is "high" that is higher than "intermediate" with its range being equal to or larger than −0.4G and smaller than −0.3G.

The travel plan generation unit 14 generates a travel plan based on the target route under the constraint condition that is set by the constraint condition setting unit 22. More specifically, the travel plan generation unit 14 generates a travel plan so that the deceleration of the vehicle V becomes equal to or lower than the maximum allowable deceleration that is set by the constraint condition setting unit 22.

FIG. 7B is a flowchart showing the autonomous traveling processing of the autonomous driving vehicle system 200. During the autonomous traveling processing, the autonomous driving vehicle system 200 acquires the emergency level, which is set by the emergency level setting unit 21, via the constraint condition setting unit 22 after step S1 described above (S21). The constraint condition setting unit 22 sets the constraint condition in the travel plan, which will be generated, according to the emergency level (S22). More specifically, the constraint condition setting unit 22 sets the maximum allowable deceleration in the travel plan so that the maximum allowable deceleration becomes higher as the emergency level is higher. The travel plan generation unit 14 generates the travel plan so that the deceleration of the vehicle V becomes equal to or lower than the maximum allowable deceleration (S23). After that, the traveling control unit 15 controls the traveling of the vehicle V so that the vehicle V travels autonomously according to the generated travel plan (S24).

Next, an example of the light turn-on state transition of the brake lights 9 in the autonomous driving vehicle system 200 is described with reference to FIG. 8. In the description below, the light turn-on state transition of the brake lights 9 during autonomous traveling when the vehicle V turns left at an intersection is assumed as in the situation shown in FIG. 5A.

Figure 8A:
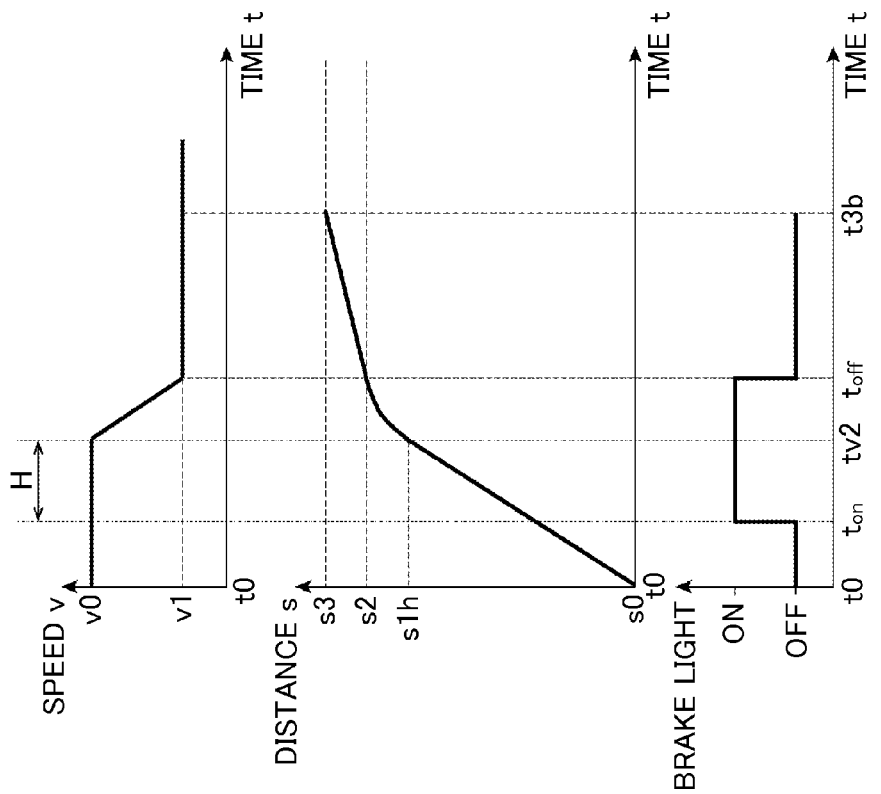
FIG. 8A is a graph showing an example of brake light turn-on state transition when the emergency level is set to "low" in the autonomous driving vehicle system shown in FIG. 6.

FIG. 8A is a graph showing an example of the light turn-on state transition of the brake lights 9 when the emergency level is set to "low" in the autonomous driving vehicle system 200. The travel plan shown in FIG. 8A is generated under the constraint condition that the maximum allowable deceleration is set approximately to −0.15G to −0.1G. In this travel plan, the vehicle V passes the position s0 at the time t0 at a vehicle speed of v0 and decelerates to the vehicle speed v2 from the braking start time $t_{v1}$ to the braking end time $t_{off}$ (from the braking start position s1*l* to the braking end position s2) with the low deceleration $a_{s1}$. After that, the vehicle V turns left at the intersection and passes the position s3 at the time t3*a*.

When the vehicle V travels autonomously according to the travel plan like this, the brake lights 9 are turned on from the light turn-on start time $t_{on}$ that is earlier than the braking start time $t_{v1}$. The brake lights 9 remain turned on when the vehicle V actually applies the brake from the braking start time $t_{v1}$, and are turned off at the braking end time $t_{off}$ of the braking.

Figure 8B:
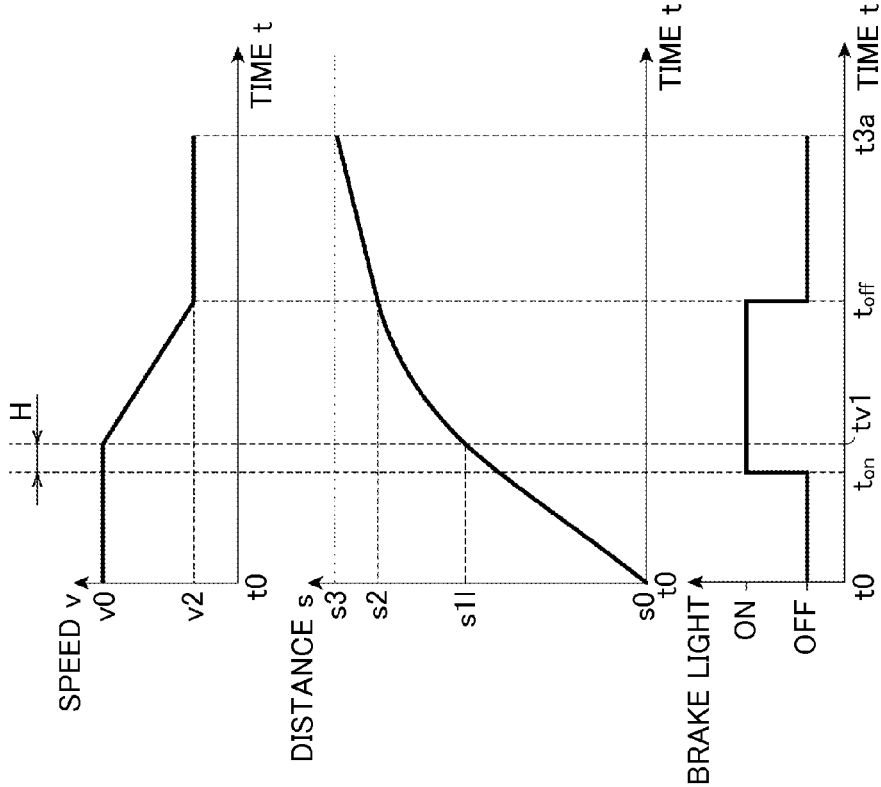
FIG. 8B is a graph showing an example of brake light turn-on state transition when the emergency level is set to "high" in the autonomous driving vehicle system shown in FIG. 6.

FIG. 8B is a graph showing an example of the light turn-on state transition of the brake lights 9 when the emergency level is set to "high" in the autonomous driving vehicle system 200. The travel plan shown in FIG. 8B is generated under the constraint condition that the maximum allowable deceleration is set approximately to −0.4G to −0.3G. In this travel plan, the vehicle V passes the position s0 at the time t0 at a vehicle speed of v0 and decelerates to the vehicle speed v2 from the braking start time $t_{v2}$ to the braking end time $t_{off}$ (from the braking start position s1*h* to the braking end position s2) with the high deceleration $a_{s2}$ that is higher than the low deceleration $a_{s1}$. After that, the vehicle V passes the position s3 at the time t3*b*.

When the vehicle V travels autonomously according to the travel plan like this, the brake lights 9 are turned on from the light turn-on start time $t_{on}$ that is earlier than the braking start time $t_{v2}$. The brake lights 9 remain turned on when the vehicle V actually applies the brake from the braking start time $t_{v2}$, and are turned off at the braking end time $t_{off}$ of the braking.

As shown in FIG. 8A and FIG. 8B, the lead time H used when the emergency level is high is longer than that used when the emergency level is low. As a result, the light turn-on start time $t_{on}$ is calculated in such a manner that the higher the emergency level is, the earlier the brake lights 9 are turned on in relation to the braking start time.

As described above, the autonomous driving vehicle system 200 in this embodiment sets a maximum allowable deceleration in a travel plan in such a manner that the higher the emergency level specified by the occupant is, the higher the maximum allowable deceleration is. Therefore, a travel plan can be generated that enables the vehicle to travel at a higher average speed for higher efficiency (shorter travel time). In addition, because braking tends to be applied with higher deceleration (more rapid deceleration in some cases) as the emergency level is higher, the possibility of collision with the following vehicle Vb increases. In this case, the above-described effect that the possibility of collision with the following vehicle Vb is reduced is remarkable.

In this embodiment, a higher emergency level, if set, results in a longer lead time H. This reduces the possibility of collision with the following vehicle Vb. In this embodiment, a lower emergency level, if set, results in a shorter lead time H. This relieves the nuisance to the driver of the following vehicle Vb that may be caused by the lighting of the brake lights 9.

In this embodiment, if the lowest emergency level is set, the lead time H may be 0 (light turn-on start time $t_{on}$=braking start time $t_{v1}$). The emergency level, though acquired in S21 in the above description, may be acquired any time before S22 in which the constraint condition is set in the travel plan, for example, before the processing in S1. In the above description, the emergency level is set by the emergency level setting unit 21 based on the input operation of the driver. Instead of or in addition to this setting method, the emergency level may be set based on the external situation (surrounding information) detected by the external sensor 1, for example, may be set automatically according to the surrounding environment.

Next, a third embodiment is described. In the description of this embodiment, only the parts differing from those in the first embodiment are described.

Figure 9:
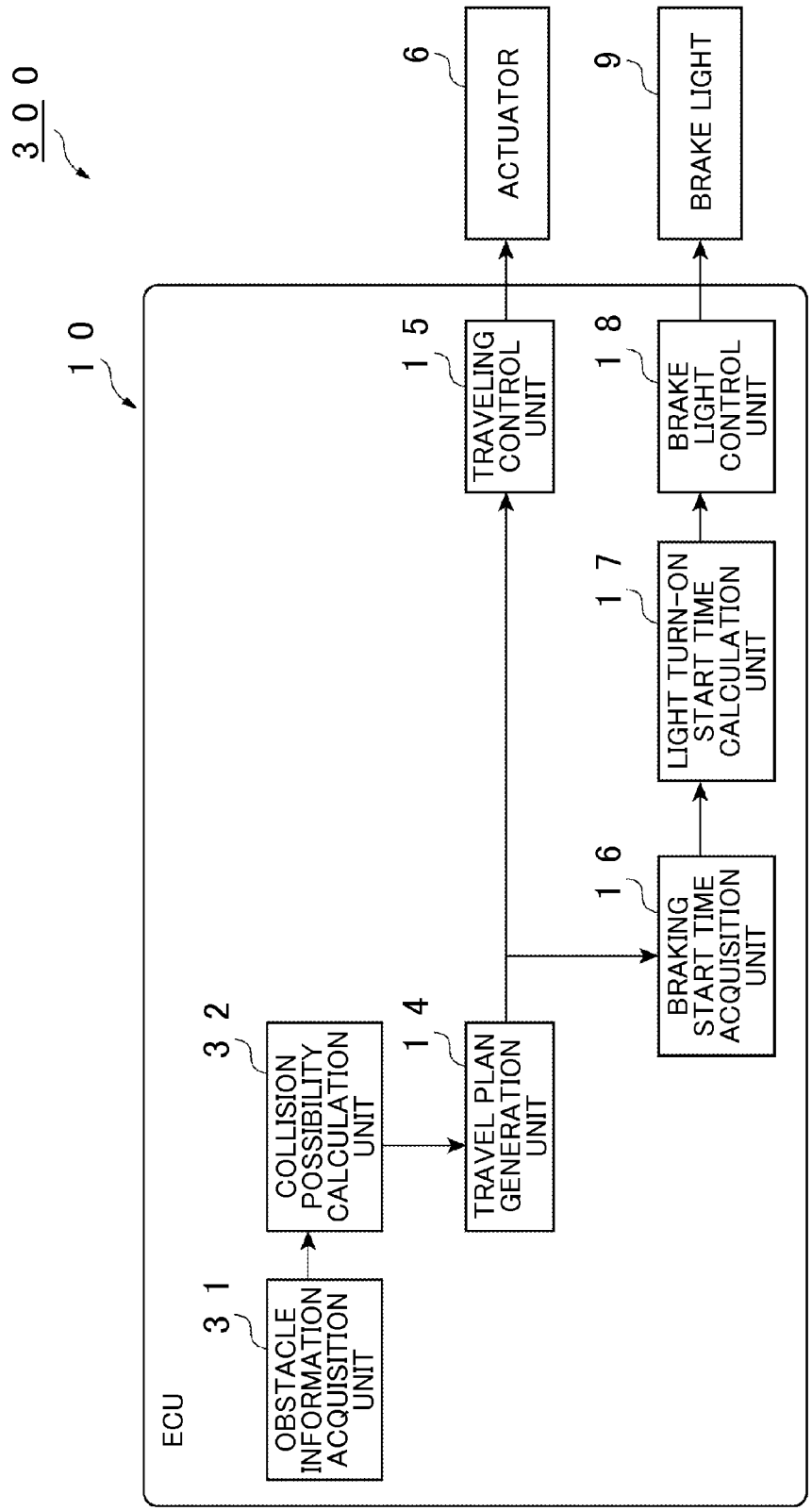
FIG. 9 is a block diagram showing the ECU of an autonomous driving vehicle system in a third embodiment.

FIG. 9 is a block diagram showing the ECU 10 of an autonomous driving vehicle system 300 in the third embodiment. As shown in FIG. 9, the autonomous driving vehicle system 300 in this embodiment differs from that in the first embodiment in that the ECU 10 includes an obstacle information acquisition unit 31 and a collision possibility calculation unit 32.

The obstacle information acquisition unit 31 acquires the obstacle information detected by the external sensor 1 (for example, radar or LIDER). The obstacle information is information on the obstacles such as moving obstacles or shielding structures that are present ahead of the vehicle V. A moving obstacle, one of the obstacles, is a movable obstacle such as a human, an animal, a bicycle, and a robot. A shielding structure is a structure that can shield a moving obstacle from the vehicle V. A shielding structure creates a blind spot where a moving obstacle is present ahead of the vehicle V. An example of a shielding structure is a building and a wall.

The collision possibility calculation unit 32 calculates the collision possibility, a possibility that a moving obstacle and the vehicle V will collide ahead of the vehicle V, based on the obstacle information acquired by the obstacle information acquisition unit 31. The collision possibility may be represented as a continuous value such as 0 to 100%. The larger the value is, the higher the possibility of collision is. If the collision possibility is equal to or higher than the upper limit threshold, it can be determined that "it is apparent that interference between the vehicle V and a moving obstacle will occur". If the collision possibility is equal to or lower than the lower limit threshold, it can be determined that "it is apparent that interference between the vehicle V and a moving obstacle will not occur". If the collision possibility is lower than the upper limit threshold and is higher than the lower limit threshold, it can be determined that "it is not apparent that interference between the vehicle V and a moving obstacle will occur (uncertain)". The upper limit threshold and the lower limit threshold, each a pre-set constant value, may be obtained empirically or experimentally.

If the presence of a moving obstacle is recognized from the obstacle information, the collision possibility calculation unit 32 predicts the behavior of the moving obstacle and calculates the collision possibility from the prediction result and the traveling state of the vehicle V detected by the internal sensor 3. The collision possibility calculation unit 32 may use a known calculation method for calculating the collision possibility. If the behavior of the moving obstacle cannot be predicted or if the presence of a shielding structure is recognized from the obstacle information, the collision possibility calculation unit 32 calculates a collision possibility that is lower than the upper limit threshold and is higher than the lower limit threshold.

If the collision possibility calculated by the collision possibility calculation unit 32 is equal to or higher than the upper limit threshold, the travel plan generation unit 14 generates a stop travel plan as the travel plan. The stop travel plan is a travel plan that performs the braking operation to avoid collision with a moving obstacle. The stop travel plan mentioned here is a travel plan that performs the braking to stop the vehicle at the stop position s2 (see FIGS. 12A and 12B), which is the braking end position for avoiding a collision with the moving obstacle, with the standard deceleration.

If the collision possibility calculated by the collision possibility calculation unit 32 is equal to or lower than the lower limit threshold, the travel plan generation unit 14 generates a passing travel plan as the travel plan. The passing travel plan is a travel plan that does not perform the braking to avoid collision with a moving obstacle. The passing travel plan mentioned here is a travel plan that passes the stop position s2 without deceleration.

If the collision possibility calculated by the collision possibility calculation unit 32 is lower than the upper limit threshold and is higher than the lower limit threshold, the travel plan generation unit 14 generates a braking postponed travel plan as the travel plan. The braking postponed travel plan is a travel plan that performs the postponed braking as the braking to avoid collision with a moving obstacle. The postponed braking, a braking the braking start time $t_v$ of which is later than that in the stop travel plan, stops the vehicle at the stop position s2 with the maximum deceleration. The maximum deceleration is the maximum deceleration the vehicle V can produce, approximately, the deceleration from −0.6G to −0.5G.

Figure 10:
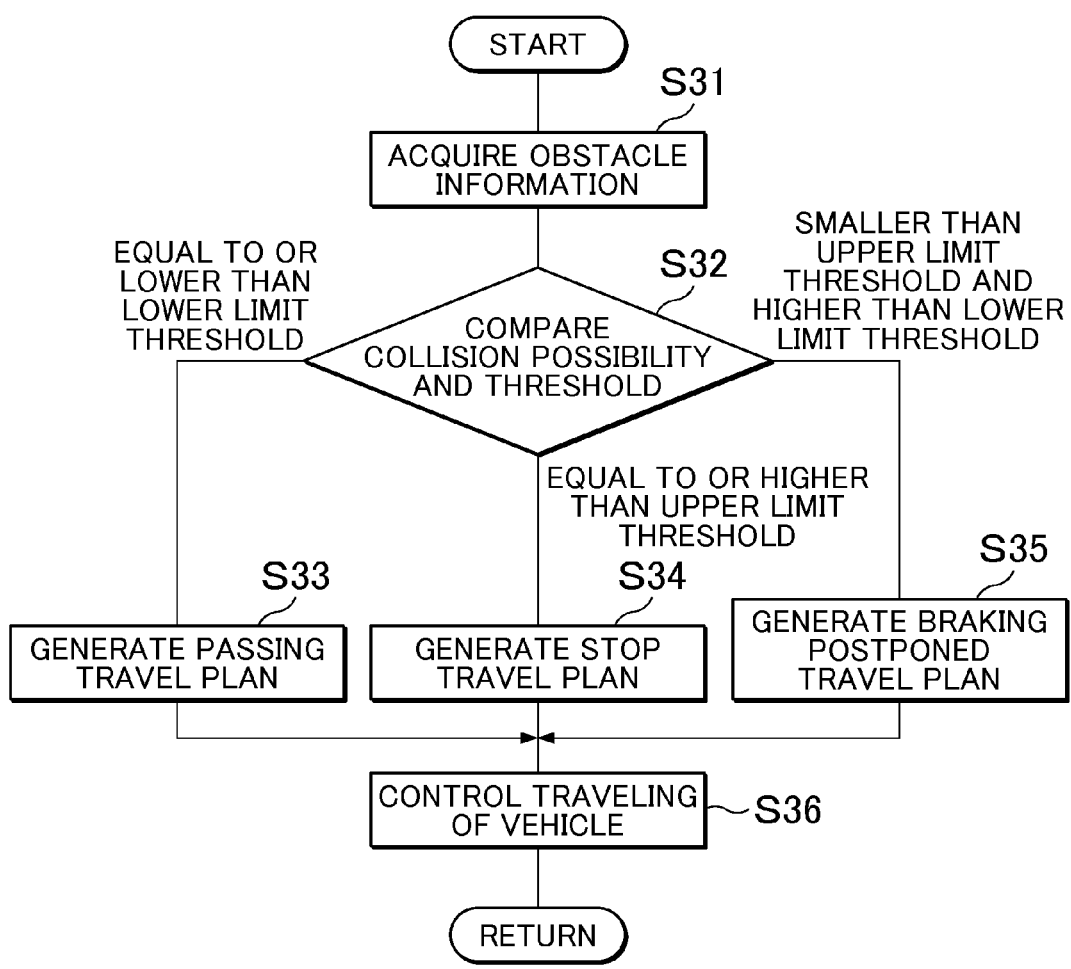
FIG. 10 is a flowchart showing the autonomous traveling processing of the autonomous driving vehicle system shown in FIG. 9.

FIG. 10 is a flowchart showing the autonomous traveling processing of the autonomous driving vehicle system 300. In the autonomous driving vehicle system 300, when the obstacle information is detected by the external sensor 1, the ECU 10 performs the autonomous traveling processing, described below, repeatedly at a predetermined periodic processing interval.

First, the obstacle information acquisition unit 31 acquires the obstacle information (S31). The collision possibility calculation unit 32 calculates the collision possibility based on the obstacle information acquired by the obstacle information acquisition unit 31 and determines whether the calculated collision possibility is equal to or lower than the lower limit threshold, is equal to or higher than the upper limit threshold, or is lower than the upper limit threshold and is higher than the lower limit threshold (S32).

If it is determined in S32 that the collision possibility is equal to or lower than the lower limit threshold, the travel plan generation unit 14 generates a passing travel plan as the travel plan (S33). If it is determined in S32 that the collision possibility is equal to or higher than the upper limit threshold, the travel plan generation unit 14 generates a stop travel plan as the travel plan (S34). If it is determined in S32 that the collision possibility is lower than the upper limit threshold and is higher than the lower limit threshold, the travel plan generation unit 14 generates a braking postponed travel plan as the travel plan (S35). After S33, S34, or S35 described above, the traveling control unit 15 controls the traveling of the vehicle V so that the vehicle V travels autonomously according to the generated travel plan.

Figure 11A:
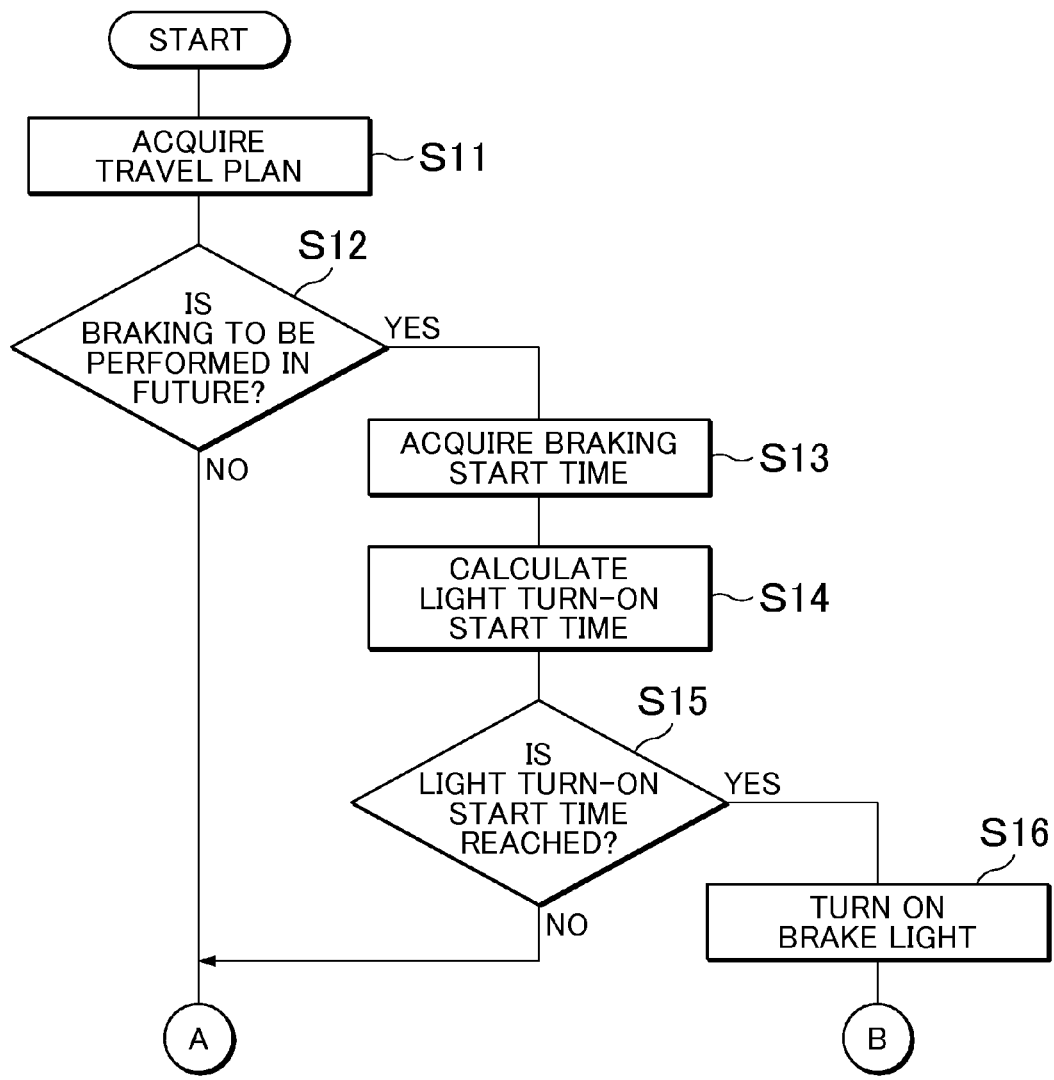
FIG. 11A and FIG. 11B are flowcharts showing the brake light turn-on processing of the autonomous driving vehicle system shown in FIG. 9.
Figure 11B:
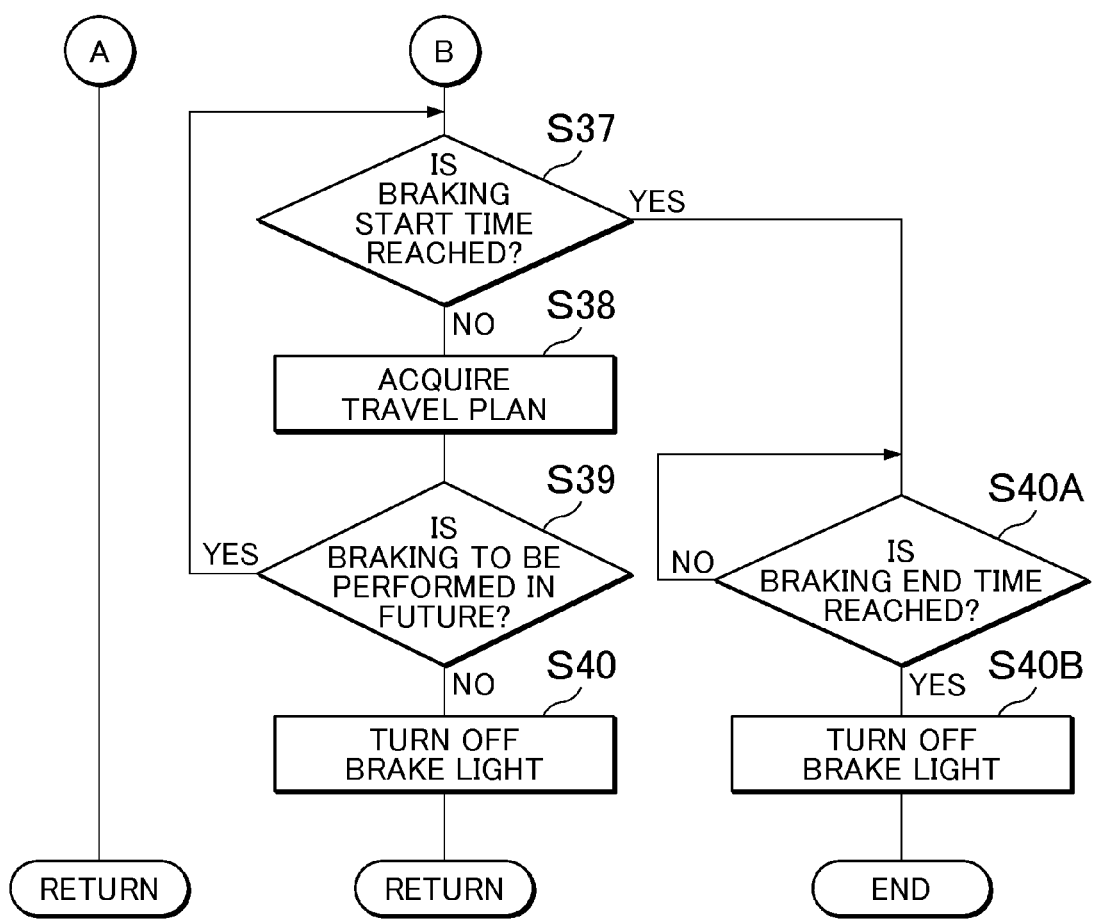

FIG. 11A and FIG. 11B are flowcharts showing the brake light turn-on processing of the autonomous driving vehicle system 300. In the brake light turn-on processing, the autonomous driving vehicle system 300 determines, after S16 in which the brake lights are turned on, whether the braking start time $t_v$ is reached (S37). If the braking start time $t_v$ is reached and the traveling control unit 15 actually causes the vehicle V to apply the brake, the brake lights 9 remain turned on in response to the braking. If the braking end time $t_{off}$ is reached and the braking of the vehicle is ended, the autonomous driving vehicle system 300 turns off the brake lights 9 at the same time the braking is ended and terminates the brake light turn-on processing (S40A, S40B).

If the braking start time $t_v$ is not reached, the braking start time acquisition unit 16 acquires the travel plan from the travel plan generation unit 14 (S38). The braking start time acquisition unit 16 determines whether the braking will be performed in the future according to the travel plan (S39). If it is determined that the braking will be performed in the future, the processing returns to S37. On the other hand, if it is not determined that the braking will be performed in the future, the brake lights 9 are turned off and the processing proceeds to the brake light turn-on processing in the next cycle (S40).

Next, an example of the light turn-on state transition of the brake lights 9 in the autonomous driving vehicle system 300 is described with reference to FIGS. 12A to 12B, FIGS. 13A to 13B, and FIGS. 14A to 14C.

Figure 13B:
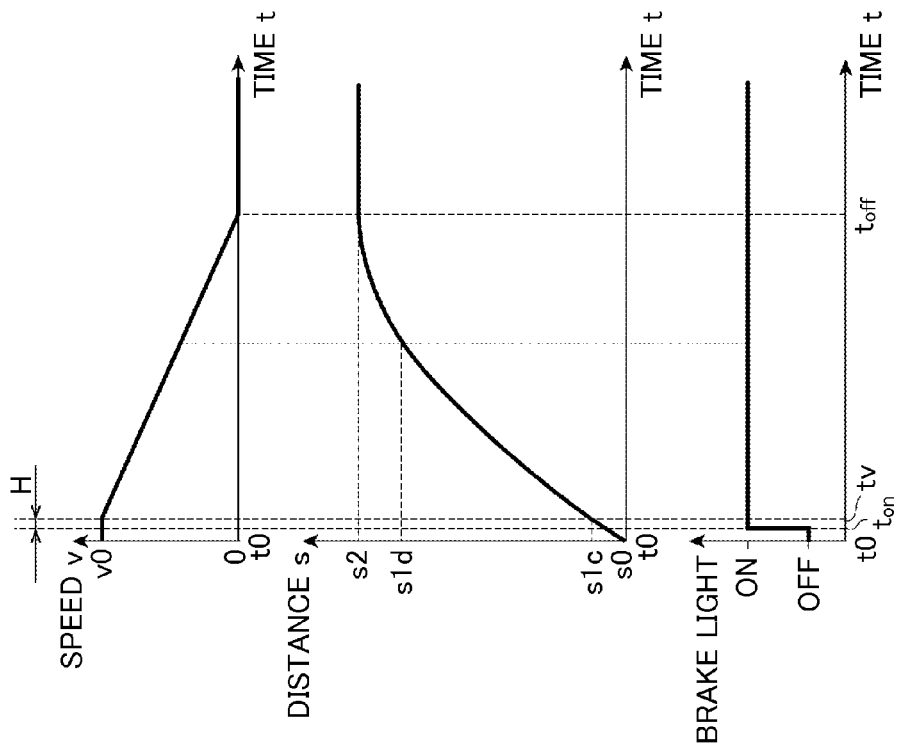
FIG. 13B is a graph showing an example of brake light turn-on state transition when the collision possibility in the autonomous driving vehicle system shown in FIG. 9 is equal to or higher than the upper limit threshold.
Figure 13A:
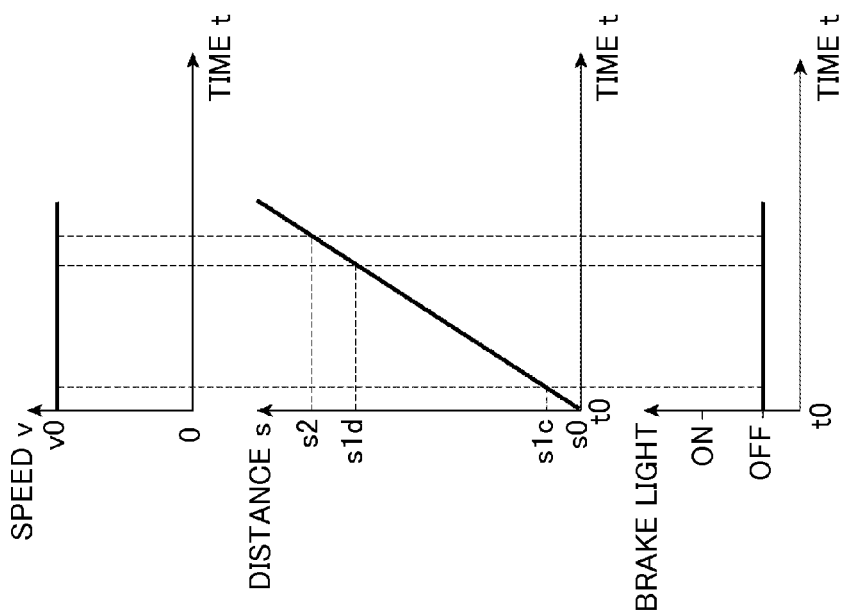
FIG. 13A is a graph showing an example of brake light turn-on state transition when the collision possibility in the autonomous driving vehicle system shown in FIG. 9 is equal to or lower than the lower limit threshold.

FIG. 12A is a bird's-eye view of the vehicle V for showing an example of the light turn-on state transition when there is a moving object 34. FIG. 12B is a bird's-eye view of the vehicle V for showing an example of the light turn-on state transition when there is a shielding structure 36. FIG. 13A is a graph showing an example of the light turn-on state transition of the brake lights 9 when it is determined that the collision possibility is equal to or lower than the lower limit threshold. FIG. 13B is a graph showing an example of the light turn-on state transition of the brake lights 9 when it is determined that the collision possibility is equal to or higher than the upper limit threshold. FIG. 14A, FIG. 14B, and FIG. 14C each is a graph showing an example of the light turn-on state transition of the brake lights 9 when it is determined that the collision possibility is lower than the upper limit threshold and is higher than the lower limit threshold.

In the example shown in FIG. 12A, the obstacle information on the moving object 34 ahead of the vehicle V is detected during autonomous traveling in which the vehicle V passes the position s0 at the time t0 at a vehicle speed of v0. In the example shown in FIG. 12B, when the vehicle V passes the position s0 at a vehicle speed of v0 during autonomous traveling, the obstacle information on the shielding structure 36, behind which the moving object 34 may be hidden, is detected ahead of the vehicle V.

If it is determined that the collision possibility is equal to or lower than the lower limit threshold, a passing travel plan is generated. As shown in FIG. 13A, this passing travel plan causes the vehicle V to maintain the vehicle speed v0 without performing the braking to avoid collision with the moving object 34 and to pass the stop position s2. When the vehicle V travels autonomously according to the passing travel plan, the turn-off state of the brake lights 9 is maintained.

On the other hand, if it is determined that the collision possibility is equal to or higher than the upper limit threshold, a stop travel plan is generated. As shown in FIG. 13B, this stop travel plan causes the vehicle V to apply the brake from the braking start time $t_v$ (braking start position s1c) with the standard deceleration and to stop at the stop position s2. When the vehicle V travels autonomously according to the stop travel plan, the brake lights 9 are turned on from the light turn-on start time $t_{on}$ that is earlier than the braking start time $t_v$, and remain turned on during the actual braking time after the braking start time $t_v$. In this case, because the stop maintaining braking is enabled to maintain the stopped state (vehicle V speed=0) even after the braking end time $t_{off}$ of the braking, the light turn-on state is maintained after the braking end time $t_{off}$ while the stop maintain braking is active.

On the other hand, if it is determined that the collision possibility is smaller than the upper limit threshold and is higher than the lower limit threshold, a braking postponed travel plan is generated. As shown in FIG. 14A, this braking postponed travel plan causes the vehicle V to maintain the vehicle speed v0 until the braking start limit time t1d at which the vehicle V reaches the braking start limit position s1d and, from this braking start limit time t1d, to perform the postponed braking, which causes the vehicle to apply the brake with the maximum deceleration, to stop the vehicle at the stop position s2. When the vehicle V travels autonomously according to the braking postponed travel plan, the brake lights 9 are started to be turned on from the light turn-on start time $t_{on}$ that is earlier than the braking start limit time t1d by the lead time H and remain turned on during the postponed braking time with the maximum deceleration after the light turn-on start time $t_{on}$. The light turn-on state is maintained after the braking end time $t_{off}$ of the braking while the stop maintain braking is active.

If it is determined that the collision possibility is equal to or lower than the lower limit threshold at the time t', which is a time between the time t0 and the braking start limit time t1d, when the vehicle V travels autonomously according to the braking postponed travel plan as shown in FIG. 14B, a passing travel plan is generated in which the vehicle speed v0 is maintained from the time t' and, at the same time, the vehicle passes the stop position s2 at the vehicle speed v0. When the vehicle V travels autonomously according to such a travel plan in which the braking postponed travel plan is switched to the passing travel plan from the time t', the brake lights 9 are started to be turned on from the light turn-on start time $t_{on}$ that is earlier than the braking start limit time t1d by the lead time H and are turned off at the time t' as shown in the figure. That is, the brake lights 9 are turned on only during the turn-on time H1 during which the postponed braking may be performed.

If it is determined that the collision possibility is equal to or higher than the upper limit threshold at the time t', which is a time between the time t0 and the braking start limit time t1d as shown in FIG. 14C, a stop travel plan is generated in which the braking is completed and the vehicle speed becomes 0 in the distance from the current position to the stop position (s2−s1d). For example, if the deceleration during this period is constant, the stop travel plan is generated in which the deceleration is $v0^2/(2\times(s2-s1d))$. When the vehicle V travels autonomously according to such a travel plan in which the braking postponed travel plan is switched to the stop travel plan from the time t', the brake lights 9 are started to be turned on from the light turn-on start time $t_{on}$ that is earlier than the braking start limit time t1d by the lead time H (that is, earlier than the time t', which is the braking start time, by the lead time H2) and remain turned on during the actual braking time after the time t' as shown in the figure. The light turn-on state is maintained after the braking end time $t_{off}$ of the braking while the stop maintain braking is active.

As described above, in the autonomous driving vehicle system 300 in this embodiment, if it is determined that the collision possibility is lower than the upper limit threshold and is higher than the lower limit threshold and that the collision with the moving object 34 ahead of the vehicle V is uncertain, the vehicle V travels autonomously according to the braking postponed travel plan that performs postponed braking. During this period, even if it is determined, at a later time t', that the collision possibility is equal to or higher than the upper limit threshold or is equal to or lower than the lower limit threshold and, accordingly, the vehicle V travels autonomously according to the stop travel plan or the passing travel plan (that is, even if it is apparent that the vehicle V will not collide, or will collide, with the moving object 34 before the braking start limit time t1d is reached) as shown in FIG. 14B and FIG. 14C, the brake lights 9 are turned on from the light turn-on start time $t_{on}$, which is earlier than the braking start limit time t1d by the lead time H, and the following vehicle Vb is informed about the postponed braking. Thus, while autonomously traveling according to a braking postponed travel plan, a warning about an uncertain postponed braking (it is uncertain whether to apply the brake) can be sent, in advance, to the following vehicle Vb by turning on the brake lights 9. This can reduce the possibility of collision with the following vehicle Vb.

In this embodiment, if it is determined that the collision possibility is lower than the upper limit threshold and is higher than the lower limit threshold, the collision with the moving object 34 ahead of the vehicle V is determined to be uncertain. In this case, the vehicle V travels autonomously according to a braking postponed travel plan, in which the postponed braking is performed for postponing the braking start time until the braking start limit time s1d, and the determination of braking is postponed until the braking start limit time s1d. This allows the vehicle V to travel efficiently without wastefully increasing the travel time.

That is, in this embodiment, the vehicle V can travel autonomously according to the braking postponed travel plan while minimizing the possibility of collision with the following vehicle Vb. Therefore, even in a situation in which it is uncertain whether to decelerate, the travel time can be reduced while reducing the possibility of collision from the following vehicle Vb.

This embodiment may be applied to the second embodiment. That is, it is possible that the autonomous driving vehicle system 300 further includes the emergency level setting unit 21 and the constraint condition setting unit 22 (see FIG. 6) and that the traveling plan generation unit 14 has the above-described function in the autonomous driving vehicle system 200.

Next, a fourth embodiment is described. In the description of this embodiment, only the parts differing from those in the first embodiment are described.

Figure 15:
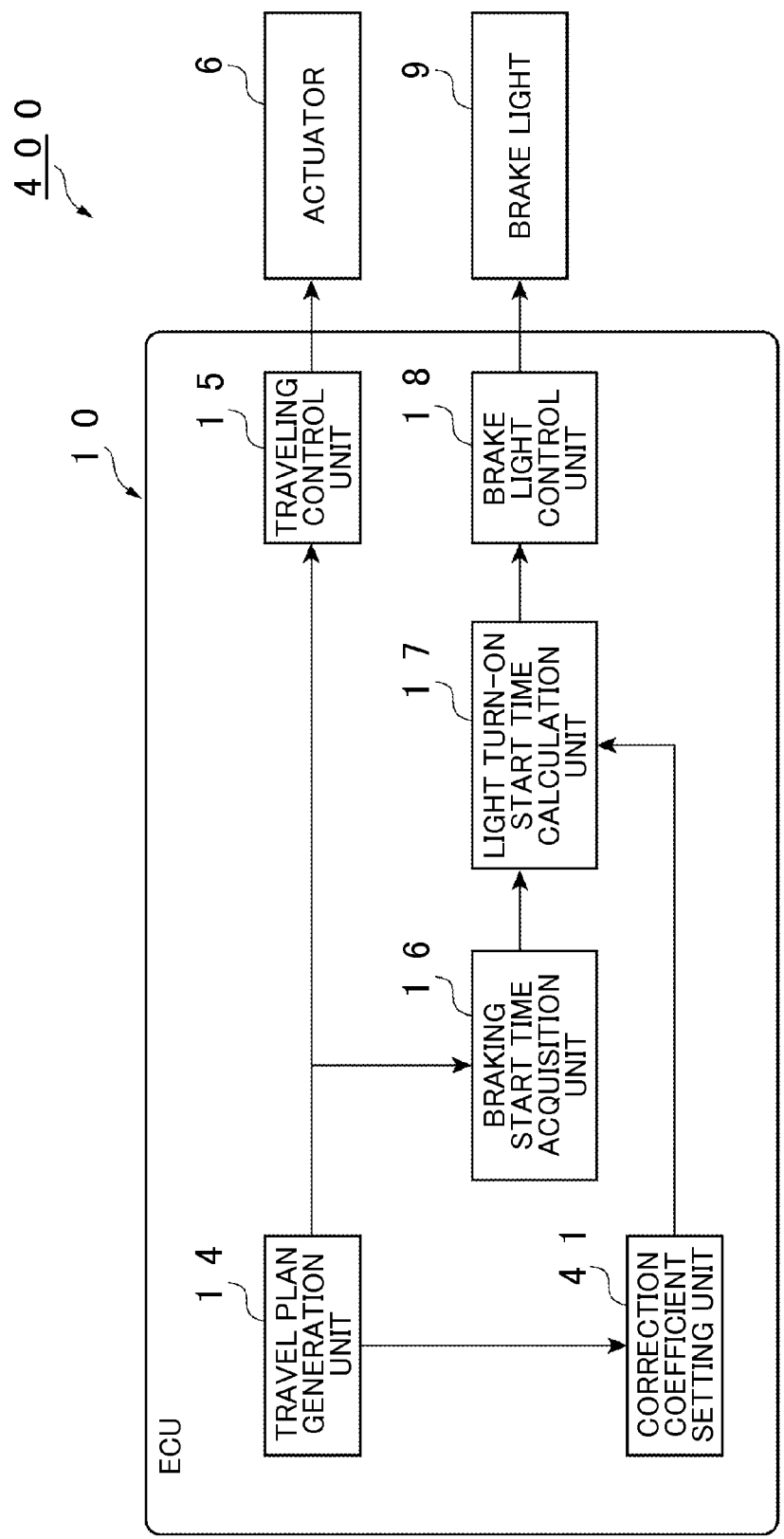
FIG. 15 is a block diagram showing the ECU of an autonomous driving vehicle system in a fourth embodiment.
Figure 16:
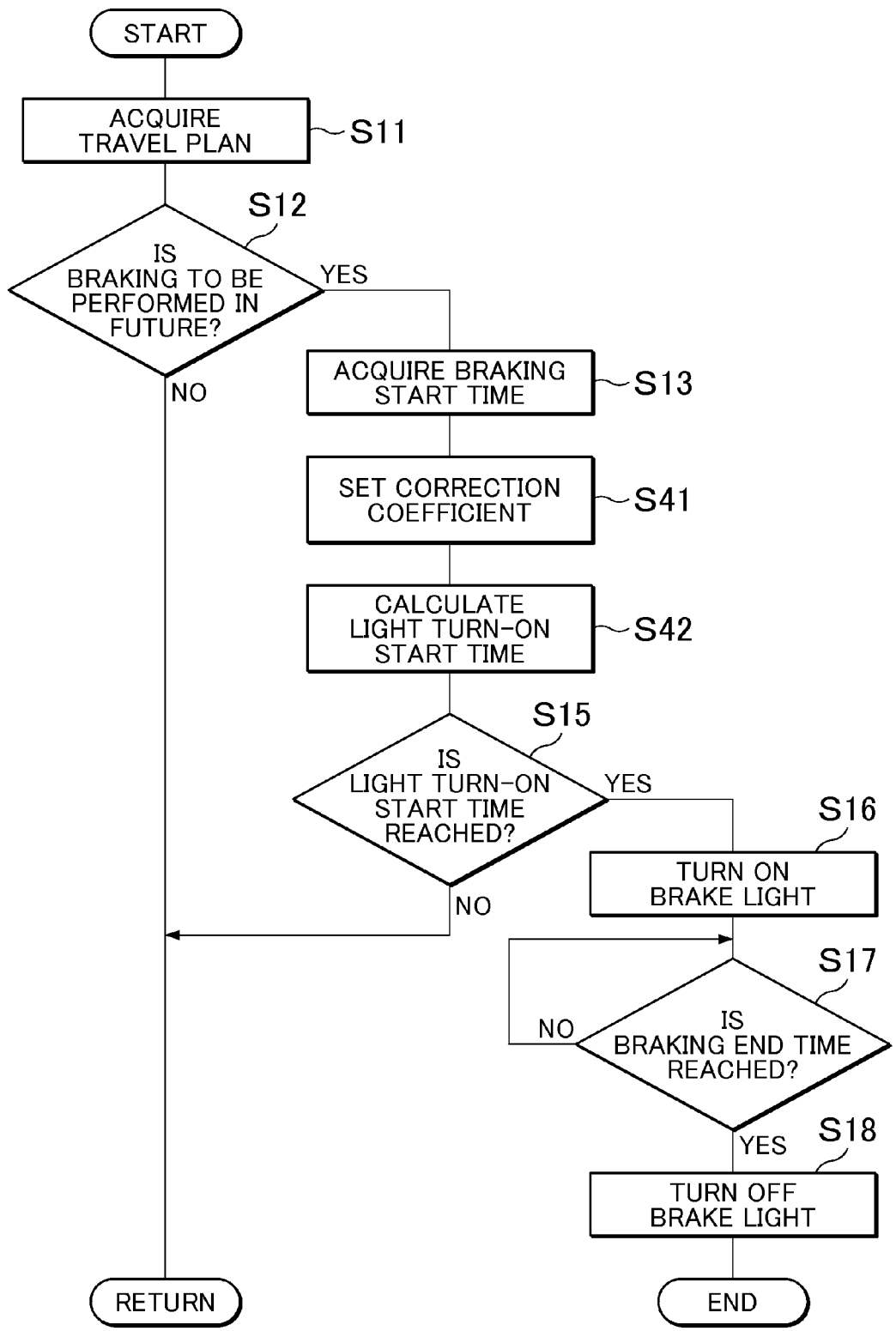
FIG. 16 is a flowchart showing the brake light turn-on processing of the autonomous driving vehicle system shown in FIG. 15.

FIG. 15 is a block diagram showing the ECU 10 of an autonomous driving vehicle system 400 in the fourth embodiment. FIG. 16 is a flowchart showing the brake light turn-on processing in the autonomous driving vehicle system shown in FIG. 15. As shown in FIG. 15, the autonomous driving vehicle system 400 in this embodiment differs from that in the first embodiment in that the ECU 10 includes a correction coefficient setting unit 41 used to set a correction coefficient k.

The correction coefficient setting unit 41 sets the correction coefficient k based on the travel plan, the map information, and the position information on the vehicle V. The correction coefficient k, a coefficient to be multiplied by a base lead time that will be described later, is a positive real number equal to or larger than 1. More specifically, the correction coefficient setting unit 41 sets the correction coefficient k as described below, based on the travel plan acquired from the travel plan generation unit 14, the map information stored in the map database 4, and the position information on the vehicle V measured by the GPS reception unit 2.

The correction coefficient setting unit 41 determines when the vehicle V applies the brake, either when turning right or left or while traveling straight ahead. The correction coefficient setting unit 41 sets a larger value for the correction coefficient k, used for the braking when turning right or left, than that for the correction coefficient k used for the braking while traveling straight ahead.

For example, the correction coefficient setting unit 41 determines the situation in which the vehicle V will apply the brake at an intersection. When the vehicle V applies the brake for turning right or left on a green light at an intersection, the correction coefficient setting unit 41 sets a larger value for the correction coefficient k than that for stopping on a red light. For example, the correction coefficient k is set to a value larger than 1 when the vehicle V applies the brake for turning right or left on a green light at an intersection, and is set to 1 when the vehicle V applies the brake for stopping on a red light. The correction coefficient setting unit 41 outputs the correction coefficient k, which is set, to the light turn-on start time calculation unit 17.

In addition, the correction coefficient setting unit 41 determines the mode of braking when the vehicle V turns right or left off and departs from the lane. A larger value may be set for the correction coefficient k when the vehicle V applies the brake for turning right or left to depart from a main road (priority road) into an alley (non-priority road) than when the vehicle V applies the brake for turning right or left to depart from an alley into another alley or from a main road into another main road. For example, the correction coefficient k is set to a value larger than 1 when the vehicle V departs from a main road into an alley, and to 1 when the vehicle V departs from an ally into another alley or from a main road into another main road. A main road refers to a wide road that forms a regional backbone road network. An alley refers to a narrow road, for example, between a building and a building.

When calculating the light turn-on start time $t_{on}$, the light turn-on start time calculation unit 17 calculates the lead time H' generated by multiplying the correction coefficient k, which is set by the correction coefficient setting unit 41, by the base lead time H0. The base lead time H0 is a time that is set in advance. In this calculation, the lead time H, calculated in the same manner as in the first embodiment, is set as the base lead time H0. The light turn-on start time calculation unit 17 calculates the light turn-on start time $t_{on}$ that is earlier than the braking start time $t_v$ by the lead time H'. For example, in the example shown in FIG. 3A, the light turn-on start time calculation unit 17 calculates the lead time H' using expression (3) given below.

$$k \times ((v1-v0)/a_n) - ((v1-v0)/a_s) \qquad (3)$$

As shown in FIG. 16, the correction coefficient setting unit 41 in the autonomous driving vehicle system 400 sets the correction coefficient k, which will be applied in the braking at the braking start time $t_v$, after the processing in S13 (S41). After that, the light turn-on start time calculation unit 17 calculates the light turn-on start time $t_{on}$ that is earlier than the braking start time $t_v$ by the lead time H' (S42). The correction coefficient k, which is set in S41 above, may be set any time before the processing of S14 in which the light turn-on start time $t_{on}$ is calculated, for example, before the processing in S13 described above.

As described above, in the autonomous driving vehicle system 400, the brake lights 9 are turned on from the light turn-on start time $t_{on}$ that is earlier than the braking start time $t_v$ by the lead time H' calculated by multiplying the base lead time H0 by the correction coefficient k. The correction coefficient k used for braking when the vehicle V turns right or left is larger than the correction coefficient k used for braking when the vehicle V travels straight ahead. This allows the light turn-on start time $t_{on}$ to be set earlier when the behavior of the vehicle V is different from that of the flow of the other vehicles.

This embodiment may be applied to the second embodiment. That is, it is possible that the autonomous driving vehicle system 400 further includes the emergency level setting unit 21 and the constraint condition setting unit 22 (see FIG. 6) and that the traveling plan generation unit 14 has the above-described function in the autonomous driving vehicle system 200. Instead of or in addition to this, this embodiment may be applied to the third embodiment. That is, it is possible that the autonomous driving vehicle system 400 further includes the obstacle information acquisition unit 31 and the collision possibility calculation unit 32 (see FIG. 9) and that the traveling plan generation unit 14 has the above-described function in the autonomous driving vehicle system 300.

Next, a fifth embodiment is described. In the description of this embodiment, only the parts differing from those in the fourth embodiment are described.

Figure 17A:
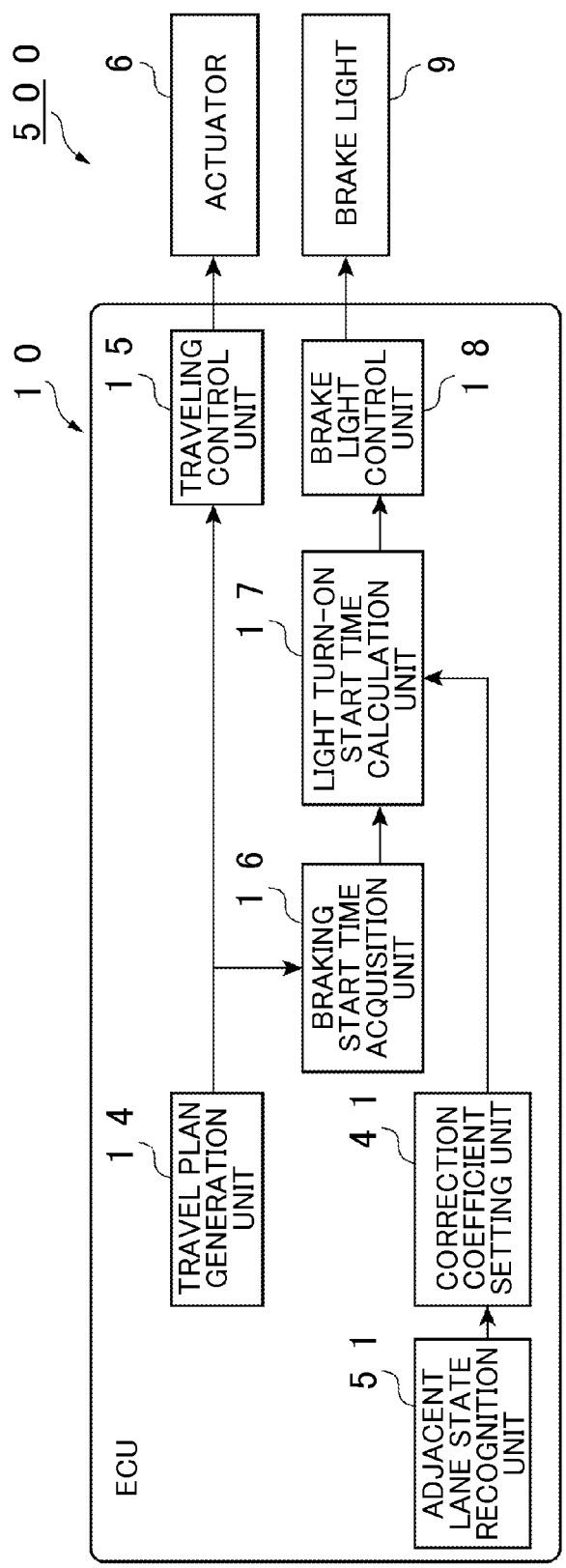
FIG. 17A is a block diagram showing the ECU of an autonomous driving vehicle system in a fifth embodiment.

FIG. 17A is a block diagram showing the ECU 10 in an autonomous driving vehicle system 500 in the fifth embodiment. As shown in FIG. 17A, the autonomous driving vehicle system 500 in this embodiment differs from that in the fourth embodiment in that the ECU 10 includes an adjacent lane state recognition unit 51.

The adjacent lane state recognition unit 51 detects the traveling space of the adjacent lane as the adjacent lane state, which is the state of the lane adjacent to the lane in which the vehicle V travels, based on the detection result of the external sensor 1. The adjacent lane state recognition unit 51 outputs the recognized adjacent lane state to the correction coefficient setting unit 41.

The correction coefficient setting unit 41 acquires the adjacent lane state from the adjacent lane state recognition unit 51 and, based on the acquired adjacent lane state, sets the correction coefficient k. More specifically, based on the adjacent lane state, the correction coefficient setting unit 41 determines whether there is a predetermined amount of traveling space, large enough for the following vehicle Vb to avoid the vehicle V, to either side of the vehicle V. The correction coefficient setting unit 41 sets the correction coefficient k in such a manner that the correction coefficient k for the braking when there is not a predetermined amount of traveling space to the side of the vehicle V is larger than the correction coefficient k for the braking when there is a predetermined amount of traveling space to the side of the vehicle V. For example, a value larger than 1 is set for the correction coefficient k for the braking when there is not a predetermined amount of traveling space, while the value of 1 is set for the correction coefficient k for the braking when there is a predetermined amount of traveling space.

A predetermined amount of traveling space refers to a traveling space large enough for the following vehicle Vb to travel therein. More specifically, when it is assumed that the following vehicle Vb will take a particular course and travel in that space, a predetermined amount of traveling space refers to a space in which the following vehicle Vb can travel without colliding with other surrounding vehicles and without interference to the travel flow that might be caused by a rapid deceleration or an avoidance operation performed by other surrounding vehicles. It can be said that there is a predetermined amount of traveling space, for example, when it is recognized that a surrounding vehicle other than the following vehicle Vb is not traveling at all in the adjacent lane or when it is expected that a surrounding vehicle, if any, will travel at a sufficiently large distance in several seconds considering the speed relative to the following vehicle Vb. It can be said that there is not a predetermined amount of traveling space, for example, when it is recognized that many surrounding vehicles other than the following vehicle Vb are traveling in the adjacent lane or when it is expected that, even if there is a few surrounding vehicles, a surrounding vehicle will travel very closely in the adjacent lane in several seconds considering the speed relative to the following vehicle Vb.

In the autonomous driving vehicle system 500 in this embodiment, the brake lights 9 are turned on from the light turn-on start time $t_{on}$ that is earlier than the braking start time $t_v$ by the lead time H' that is calculated by multiplying the base lead time H0 by the correction coefficient k. In this case, the correction coefficient k for the braking when there is not a predetermined amount of traveling space to the side of the vehicle V is larger than the correction coefficient k for the braking when there is a predetermined amount of traveling space to the side of the vehicle V. This allows the light turn-on start time $t_{on}$ to be set earlier, for example, when there is no space in which the following vehicle Vb will pass the vehicle V or, even if there is such a space, when the following vehicle Vb cannot pass the vehicle V because there are other vehicles.

Next, a sixth embodiment is described. In the description of this embodiment, only the parts differing from those in the fourth embodiment are described.

Figure 17B:
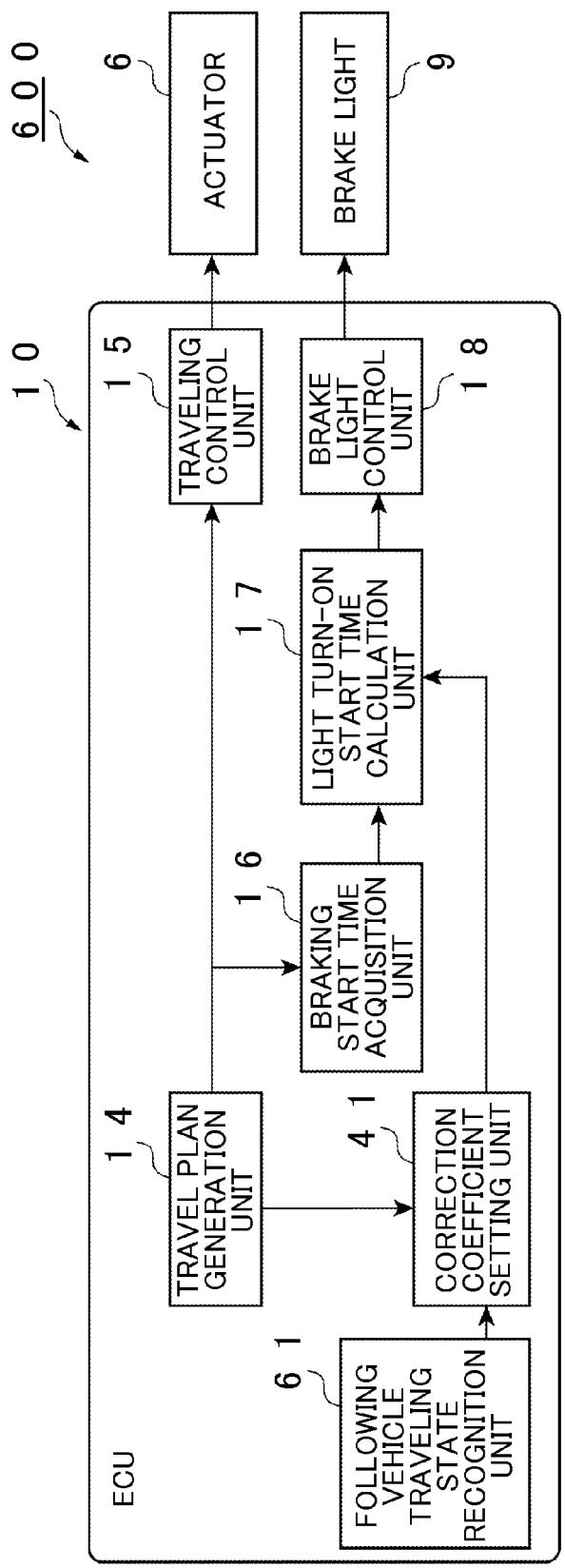
FIG. 17B is a block diagram showing the ECU of an autonomous driving vehicle system in a sixth embodiment.

FIG. 17B is a block diagram showing the ECU 10 of an autonomous driving vehicle system 600 in the sixth embodiment. As shown in FIG. 17B, the autonomous driving vehicle system 600 in this embodiment differs from that in the fourth embodiment in that the ECU 10 includes a following vehicle traveling state recognition unit 61.

The following vehicle traveling state recognition unit 61 detects the inter-vehicle distance and the relative speed to the following vehicle Vb based on the detection result of the external sensor 1. The following vehicle traveling state recognition unit 61 outputs the detected inter-vehicle distance and relative speed to the correction coefficient setting unit 41.

The correction coefficient setting unit 41 acquires the inter-vehicle distance and relative speed from the following vehicle traveling state recognition unit 61 and, based on the acquired inter-vehicle distance and relative speed, sets the correction coefficient k. More specifically, the correction coefficient setting unit 41 calculates the time to collision (Time_To_Collision: TTC)) to the following vehicle Vb based on the inter-vehicle distance and the relative speed and, assuming that the collision possibility will increase as the time to collision is shorter, increases the correction coefficient k for the braking. The correction coefficient setting unit 41 includes a map in which pre-set times to collision are associated with correction coefficients k. By referencing this map, the correction coefficient setting unit 41 sets the correction coefficient k based on the calculated time to collision.

In the autonomous driving vehicle system 600 in this embodiment, the brake lights 9 are turned on from the light turn-on start time $t_{on}$ that is earlier than the braking start time $t_v$ by the lead time H' calculated by multiplying the base lead time H0 by the correction coefficient k. The shorter the time to collision is, the larger the correction coefficient k is. This allows the light turn-on start time $t_{on}$ to be set earlier as the possibility of collision with the following vehicle Vb is expected to be higher.

This embodiment may be applied to the fifth embodiment. That is, it is possible that the autonomous driving vehicle system 600 further includes the adjacent lane state recognition unit 51 (see FIG. 17A) and that the correction coefficient setting unit 41 has the above-described function in the autonomous driving vehicle system 500.

Next, a seventh embodiment is described. In the description of this embodiment, only the parts differing from those in the fourth embodiment are described.

Figure 18A:
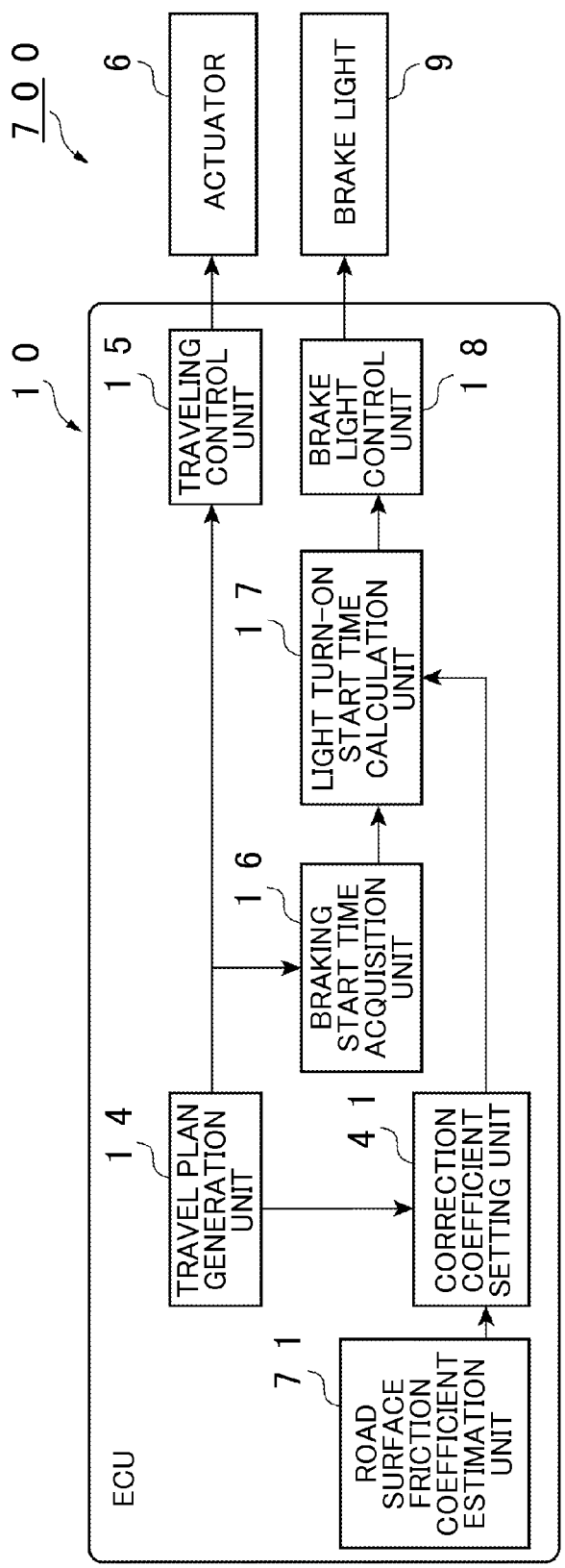
FIG. 18A is a block diagram showing the ECU of an autonomous driving vehicle system in a seventh embodiment.

FIG. 18A is a block diagram showing the ECU 10 of an autonomous driving vehicle system 700 in the seventh embodiment. As shown in FIG. 18A, the autonomous driving vehicle system 700 in this embodiment differs from that in the fourth embodiment in that the ECU 10 includes a road surface friction coefficient estimation unit 71.

The road surface friction coefficient estimation unit 71 estimates the road surface friction coefficient of a road surface on which the vehicle V travels. To estimate the road surface friction coefficient, a known estimation method may be used, for example, the road surface friction coefficient is estimated from the detection result (for example, the captured image of the road surface) obtained by the external sensor 1. The road surface friction coefficient estimation unit 71 outputs the estimated road surface friction coefficient to the correction coefficient setting unit 41.

The correction coefficient setting unit 41 acquires the road surface friction coefficient from the road surface friction coefficient estimation unit 71 and, based on the acquired road surface friction coefficient, sets the correction coefficient k. More specifically, the correction coefficient setting unit 41 sets a larger correction coefficient k for the braking of the vehicle V as the road surface friction coefficient is smaller. The correction coefficient setting unit 41 includes a map in which pre-set road surface friction coefficients are associated with correction coefficients k. By referencing this map, the correction coefficient setting unit 41 sets the correction coefficient k based on the road surface friction coefficient estimated by the road surface friction coefficient estimation unit 71.

In the autonomous driving vehicle system 700 in this embodiment, the brake lights 9 are turned on from the light turn-on start time $t_{on}$ that is earlier than the braking start time $t_v$ by the lead time H' calculated by multiplying the base lead time H0 by the correction coefficient k. The smaller the road surface friction coefficient is, the larger the correction coefficient k is. This allows the light turn-on start time $t_{on}$ to be set earlier when the frictional force of the road surface is decreased due to rain or snow and therefore the average braking distance becomes longer.

This embodiment may be applied to the fifth embodiment. That is, it is possible that the autonomous driving vehicle system 700 further includes the adjacent lane state recognition unit 51 (see FIG. 17A) and that the correction coefficient setting unit 41 has the above-described function in the autonomous driving vehicle system 500. Instead of or in addition to this, this embodiment may be applied to the sixth embodiment. That is, it is possible that the autonomous driving vehicle system 700 further includes the following vehicle traveling state recognition unit 61 (see FIG. 17B) and that the correction coefficient setting unit 41 has the above-described function in the autonomous driving vehicle system 600.

Next, an eighth embodiment is described. In the description of this embodiment, only the parts differing from those in the fourth embodiment are described.

Figure 18B:
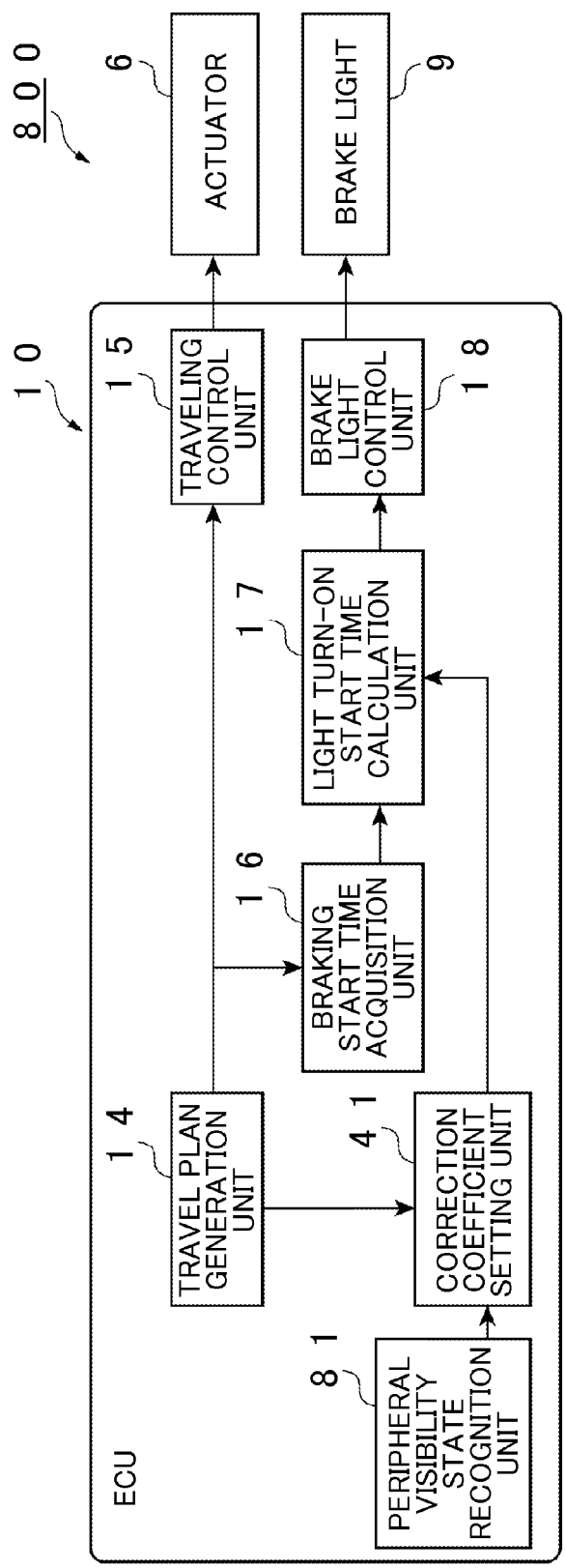
FIG. 18B is a block diagram showing the ECU of an autonomous driving vehicle system in an eighth embodiment.

FIG. 18B is a block diagram showing the ECU 10 of an autonomous driving vehicle system 800 in the eighth embodiment. As shown in FIG. 18B, the autonomous driving vehicle system 800 in this embodiment differs from that in the fourth embodiment in that the ECU 10 includes a peripheral visibility state recognition unit 81.

The peripheral visibility state recognition unit 81 recognizes the visibility level around the vehicle V based on the detection result obtained by the external sensor 1. To detect the visibility level, a known method may be used, for example, a method based on the camera-captured information, windshield wiper operation information, or headlight switching information (high beam or low beam) may be used. The peripheral visibility state recognition unit 81 outputs the recognized visibility state to the correction coefficient setting unit 41. The visibility level, which indicates the visibility level, may be set to a continuous value (for example, a value in the range 0 to 1). In this case, the smaller the value is, the worse the visibility is. In addition, the visibility level may be set to a value associated with the sight distance (maximum distance at which an object can be seen clearly with the naked eyes). In this case, the smaller the value is, the worse the visibility is. The visibility level is not limited to a particular value but a known index value may be used for it.

The correction coefficient setting unit 41 acquires the visibility level from the peripheral visibility state recognition unit 81 and, based on the acquired visibility level, sets the correction coefficient k. More specifically, the correction coefficient setting unit 41 sets a larger correction coefficient k for the braking of the vehicle V as the visibility level is lower. For example, the correction coefficient setting unit 41 includes a map in which pre-set visibility levels are associated with correction coefficients k. By referencing this map, the correction coefficient setting unit 41 sets the correction coefficient k based on the virility level recognized by the peripheral visibility state recognition unit 81.

In the autonomous driving vehicle system 800 in this embodiment, the brake lights 9 are turned on from the light turn-on start time $t_{on}$ that is earlier than the braking start time $t_v$ by the lead time H' calculated by multiplying the base lead time H0 by the correction coefficient k. The lower the visibility level is, the larger the correction coefficient k for the braking is. This allows the light turn-on start time $t_{on}$ to be set earlier as the visibility gets worse either due to fog or rain or when the surrounding becomes dark.

This embodiment may be applied to the fifth embodiment. That is, it is possible that the autonomous driving vehicle system 800 further includes the adjacent lane state recognition unit 51 (see FIG. 17A) and that the correction coefficient setting unit 41 has the above-described function in the autonomous driving vehicle system 500. Instead of or in addition to this, this embodiment may be applied to the sixth embodiment. That is, it is possible that the autonomous driving vehicle system 800 further includes the following vehicle traveling state recognition unit 61 (see FIG. 17B) and that the correction coefficient setting unit 41 has the above-described function in the autonomous driving vehicle system 600. In addition, instead of or in addition to this, this embodiment may be applied to the seventh embodiment. That is, it is possible that the autonomous driving vehicle system 800 further includes the road surface friction coefficient estimation unit 71 (see FIG. 18A) and that the correction coefficient setting unit 41 has the above-described function in the autonomous driving vehicle system 700.

While the embodiments of the present invention have been described above, it is to be understood that the present invention is not limited to the specific embodiments described above and may be implemented in various modes.

In the above embodiments, there is no need to set the braking force exactly to zero during the lead time H in which the light turn-on start time is earlier than the actual braking start time $t_v$. During this time, a weak braking force such as that generated by an engine brake, weak enough not to affect the operation state of the vehicle V, may be applied.

In the above embodiments, though the brake lights 9 are used as a warning light that gives a warning to the following vehicle Vb, other existing lights such as hazard lamps may also be used. The brake lights 9, if used, could smoothly prompt the driver of the following vehicle Vb to decelerate with minimum incompatibility. An existing lamp, if used, requires no additional cost. A new warning light (such as a LED display light) may also be used as a warning light.

In the above embodiments, a part of each function of the ECU 10, that is, a part of the vehicle position recognition unit 11, external situation recognition unit 12, traveling state recognition unit 13, travel plan generation unit 14, traveling control unit 15, braking start time acquisition unit 16, light turn-on start time calculation unit 17, brake light control unit 18, constraint condition setting unit 22, obstacle information acquisition unit 31, collision possibility calculation unit 32, correction coefficient setting unit 41, adjacent lane state recognition unit 51, following vehicle traveling state recognition unit 61, road surface friction coefficient estimation unit 71, and peripheral visibility state recognition unit 81, may be executed by a computer in the facilities, such as an information processing center capable of communicating with the vehicle V, or may be executed by a plurality of ECUs.

What is claimed is:

1. An autonomous driving vehicle system comprising:
   an external sensor configured to detect surrounding information on a vehicle; and
   at least one electronic control unit configured to:
      generate a travel plan along a pre-set target route based on the surrounding information and map information;
      autonomously control a traveling of the vehicle based on the travel plan; and turn on a warning light earlier than a start time of a braking of the vehicle in the travel plan, the warning light informing a following vehicle about the braking, the start time being estimated based on the traveling plan along the pre-set target route.

2. The autonomous driving vehicle system according to claim 1, further comprising:
an HMI configured to set an emergency level of traveling of the vehicle based on at least one of an input operation by an occupant of the vehicle and the surrounding information, wherein
the electronic control unit is further configured to set a higher maximum allowable deceleration of the vehicle as the emergency level is higher, the maximum allowable deceleration being a maximum deceleration allowable during autonomous traveling, and
to generate the travel plan in such a manner that a deceleration of the vehicle is equal to or lower than the maximum allowable deceleration.

3. The autonomous driving vehicle system according to claim 1, wherein
the electronic control unit is further configured to:
acquire obstacle information on an obstacle ahead of the vehicle based on the surrounding information; and
calculate a collision possibility that a moving obstacle and the vehicle collide ahead of the vehicle, and
generate the travel plan that performs a braking for avoiding collision with the moving obstacle when the collision possibility is equal to or higher than an upper limit threshold,
generate the travel plan that does not perform the braking for avoiding collision with the moving obstacle when the collision possibility is equal to or lower than a lower limit threshold, and
generate the travel plan that performs a postponed braking as the braking for avoiding collision with the moving obstacle when the collision possibility is lower than the upper limit threshold and is higher than the lower limit threshold, the postponed braking being a braking in which a start of the braking is delayed as compared to a start of the braking performed when the collision possibility is equal to or higher than the upper limit threshold.

4. The autonomous driving vehicle system according to claim 1, wherein
the surrounding information includes information on a width of a lane in which the vehicle is traveling and information on a position of an obstacle around the vehicle.

5. The autonomous driving vehicle system according to claim 1, wherein
the map information includes position information on a road, information on a road shape, and position information on an intersection and a junction.

6. The autonomous driving vehicle system according to claim 1, wherein
the map information is recorded on a recording medium mounted in the vehicle.

7. The autonomous driving vehicle system according to claim 1, wherein
the map information is supplied from a communication center, capable of communicating with the vehicle, to the vehicle.

8. The autonomous driving vehicle system according to claim 1, wherein the electronic control unit is further configured to:
set a correction coefficient based on the travel plan, the map information, and position information on the vehicle,
set the correction coefficient to be larger when the vehicle is braked to turn right or left than when the vehicle is braked during travel straight ahead, and
turn on the warning light earlier than a braking start time of the vehicle by a time generated by multiplying a pre-set base time by the correction coefficient.

9. The autonomous driving vehicle system according to claim 1, wherein
the electronic control unit is further configured to:
set a correction coefficient based on the surrounding information on the vehicle,
set the correction coefficient in such a manner that a correction coefficient for a braking when there is not a predetermined amount of traveling space, where a following vehicle can travel, lateral to the vehicle is larger than a correction coefficient for a braking when there is the predetermined amount of traveling space lateral to the vehicle, and
turn on the warning light earlier than a braking start time of the vehicle by a time generated by multiplying a pre-set base time by the correction coefficient.

10. The autonomous driving vehicle system according to claim 1, wherein
the electronic control unit is further configured to:
set a correction coefficient based on the surrounding information on the vehicle,
set the correction coefficient for the braking of the vehicle in such a manner that the correction coefficient is larger as a time to collision of the vehicle to a following vehicle is shorter, and
turn on the warning light earlier than a braking start time of the vehicle by a time generated by multiplying a pre-set base time by the correction coefficient.

11. The autonomous driving vehicle system according to claim 1, wherein
the electronic control unit is further configured to:
set a correction coefficient based on the surrounding information on the vehicle,
set the correction coefficient for the braking of the vehicle in such a manner that the correction coefficient is larger as a road surface friction coefficient of a road surface on which the vehicle travels is smaller, and
turn on the warning light earlier than a braking start time of the vehicle by a time generated by multiplying a pre-set base time by the correction coefficient.

12. The autonomous driving vehicle system according to claim 1, wherein
the electronic control unit is further configured to:
set a correction coefficient based on the surrounding information on the vehicle,
set the correction coefficient for the braking of the vehicle in such a manner that the correction coefficient is larger as a visibility level of the vehicle is lower, and
turn on the warning light earlier than a braking start time of the vehicle by a time generated by multiplying a pre-set base time by the correction coefficient.

* * * * *